(12) United States Patent
Kilmer

(10) Patent No.: US 11,473,265 B2
(45) Date of Patent: *Oct. 18, 2022

(54) LOW DISTURBANCE TILE INSTALLATION PLOW AND SYSTEM THEREOF

(71) Applicant: Timothy Eldred Kilmer, Beresford, SD (US)

(72) Inventor: Timothy Eldred Kilmer, Beresford, SD (US)

(*) Notice: Subject to any disclaimer, the term of this patent is extended or adjusted under 35 U.S.C. 154(b) by 0 days.

This patent is subject to a terminal disclaimer.

(21) Appl. No.: 17/346,211

(22) Filed: Jun. 12, 2021

(65) Prior Publication Data

US 2021/0301496 A1 Sep. 30, 2021

Related U.S. Application Data

(63) Continuation of application No. 16/832,292, filed on Mar. 27, 2020, now Pat. No. 11,035,098.

(60) Provisional application No. 62/798,355, filed on Jan. 29, 2019.

(51) Int. Cl.
*E02F 5/10* (2006.01)
*F16L 1/032* (2006.01)

(52) U.S. Cl.
CPC ............... *E02F 5/10* (2013.01); *E02F 5/102* (2013.01); *F16L 1/032* (2013.01)

(58) Field of Classification Search
CPC ... E02F 5/10; E02F 5/102; F16L 1/028; F16L 1/032; F16L 1/036
USPC .................. 405/180, 181, 182, 183
See application file for complete search history.

(56) References Cited

U.S. PATENT DOCUMENTS

| | | | | |
|---|---|---|---|---|
| 2,812,731 A * | 11/1957 | Gardner | .................. | E02F 5/102 172/699 |
| 3,031,854 A * | 5/1962 | Willner | .................... | E02F 5/102 172/770 |
| 3,659,426 A * | 5/1972 | Caldwell | ................. | E02F 5/102 172/699 |
| 3,684,030 A * | 8/1972 | Lucero | .................... | E02F 5/102 37/367 |
| 3,802,210 A * | 4/1974 | D'Andrea | ............... | E02F 5/102 405/178 |
| 3,874,182 A * | 4/1975 | Potter | ....................... | E02F 5/12 405/179 |
| 3,886,755 A * | 6/1975 | Lundin | .................... | H02G 1/06 405/177 |
| 3,935,712 A * | 2/1976 | Erickson | ................. | E02F 5/103 172/40 |
| 4,014,175 A * | 3/1977 | Brink | ....................... | E02F 5/102 37/370 |
| 4,142,817 A * | 3/1979 | Lazure | .................... | F16L 1/032 37/367 |

(Continued)

FOREIGN PATENT DOCUMENTS

GB 1360964 A * 7/1974 .............. E02F 5/101

*Primary Examiner* — Frederick L Lagman
(74) *Attorney, Agent, or Firm* — The Iwashko Law Firm, PLLC; Lev Ivan Gabriel Iwashko

(57) ABSTRACT

A the installation plow connected to a mechanical arm of a vehicle to install a tile below a ground surface, the tile installation plow including a main body to be inserted at least partially within the ground surface, a boot removably disposed on at least a portion of an inner surface of the main body to direct the tile along a portion of the main body under the ground surface, and a tile cart connected to the vehicle to hold the tile thereon.

14 Claims, 28 Drawing Sheets

(56) References Cited

U.S. PATENT DOCUMENTS

| | | | | |
|---|---|---|---|---|
| 4,637,755 | A * | 1/1987 | Tollefson | A01G 25/06 405/181 |
| 4,655,639 | A * | 4/1987 | Reece | E02F 5/104 405/181 |
| 5,281,054 | A * | 1/1994 | O'Riordan | E02F 5/103 405/182 |
| 5,526,759 | A * | 6/1996 | Cox | A01K 39/014 119/51.01 |
| 5,743,675 | A * | 4/1998 | Fluharty | E02F 5/102 405/183 |
| 6,193,440 | B1 * | 2/2001 | Pidgeon | E02F 5/14 37/106 |
| 6,299,381 | B1 * | 10/2001 | Liebrecht, Jr. | E02F 3/06 405/181 |
| 7,637,697 | B1 * | 12/2009 | Holland | E02F 5/00 405/177 |
| 8,047,744 | B2 * | 11/2011 | Hall | E02F 5/101 405/181 |
| 8,596,914 | B2 * | 12/2013 | Baber | E02F 5/10 405/184 |
| 8,814,474 | B2 * | 8/2014 | Bell | E02F 5/102 405/181 |
| 10,024,459 | B1 * | 7/2018 | Friedlein | E02F 5/145 |
| 11,035,098 | B2 * | 6/2021 | Kilmer | E02F 5/145 |
| 2015/0101217 | A1 * | 4/2015 | Paull | E02F 5/027 37/367 |
| 2016/0108606 | A1 * | 4/2016 | Strutynsky | E02F 5/103 37/351 |

* cited by examiner

LOW DISTURBANCE TILE INSTALLATION PLOW AND SYSTEM THEREOF

CROSS REFERENCE TO RELATED APPLICATIONS

This application is a continuation of issued U.S. nonprovisional patent application Ser. No. 16/832,292 now U.S. Pat. No. 11,035,098, entitled "LOW DISTURBANCE TILE INSTALLATION PLOW AND SYSTEM THEREOF," which was filed on Mar. 27, 2020, which also claimed priority from provisional patent application Ser. No. 62/798,355, which was filed on Jan. 29, 2019.

BACKGROUND

1. Field

The present general inventive concept relates generally to a tile installation plow. Specifically, the present general inventive concept relates to a low disturbance tile installation plow and system thereof, which simplifies the tile installation process and causes minimal disturbance to any surrounding ground surface.

2. Description of the Related Art

In an agricultural environment, an abundance of underground water is a concern because of potential damage to plants and/or crops. Moreover, when a ground surface, such as dirt and soil, is saturated with water it becomes soft and loses stability. An unstable ground is a problem for people working in fields, as the ground becomes harder to walk on. Additionally, any vehicles traveling over the ground will likely cause significant damage and/or get stuck in mud.

These scenarios can be a nightmare for people that need to access the fields especially during important seasons for planting new crops and/or harvest grown crops.

Drain tiles are a type of tubing that can be used to lower a water table in the ground. Specifically, drain tiles can be placed underground to redirect the flow of water more efficiently and allow the plants and/or the crops to have access to as much as they need without a risk of oversaturation.

Currently, there are different types of equipment for installing drain tiles. However, existing equipment are inefficient in implementation as they cause high disturbance to the surrounding ground and/or are not customizable based on a user's requirements. Specifically, existing plows are pre-assembled, have full shape configurations, and/or do not have removable portions thereof. As such, existing plows are not easily portable, which significantly increases shipping costs.

Therefore, there is a need for a low disturbance tile installation plow that can be customized for the user and/or the land being developed.

SUMMARY

The present general inventive concept provides a low disturbance tile installation plow and system thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a tile installation plow connected to a mechanical arm of a vehicle to install a tile below a ground surface, the tile installation plow including a main body to be inserted at least partially within the ground surface, a boot removably disposed on at least a portion of an inner surface of the main body to direct the tile along a portion of the main body under the around surface, and a tile cart connected to the vehicle to hold the tile thereon.

The main body may include a lateral bar, a first panel removably disposed on a first end of the lateral bar to till dirt in response to movement of the vehicle on the ground surface, such that the first panel moves through the ground surface, a second panel removably disposed on a second end of the lateral bar to till dirt in response to movement of the vehicle on the ground surface, such that the second panel moves through the ground surface, and a ground-pulverizing panel connected to the first panel and the second panel to protrude away from the first panel and the second panel to break apart the ground surface in response to movement of the vehicle.

The first panel and the second panel may each include a top portion removably disposed on the lateral bar, and a bottom portion oriented at a downward angle with respect to the top portion, and toward a central point with respect to the lateral bar, such that the first panel and the second panel are connected.

The main body may further include a stem perpendicularly connected to at least a portion of the lateral bar with respect to a direction to provide a surface area for the mechanical arm to grasp, such that the main body moves in response to a movement of the mechanical arm.

The tile installation plow may further include a hydraulic tile feeder disposed on at least a portion of the main body to move the tile from the tile cart into the boot.

The hydraulic tile feeder may be wirelessly synchronized to a rotation speed of a spool on the tile cart, such that the hydraulic tile feeder adjusts a speed of moving the tile based on the rotation speed of the tile cart.

The tile installation plow may further include a dirt remover pivotally disposed on at least a portion of the main body to move from up in a first position to at least partially down in a second position, such that dirt is removed within the main body.

The foregoing and/or other features and utilities of the present general inventive concept may also be achieved by providing a tile installation plow connected to a vehicle to install a tile below a ground surface, the tile installation plow including a main body oriented at a predetermined angle with respect to the ground surface to be inserted at least partially within the ground surface, and a boot disposed on an entire length of the main body, the boot including a tile-receiving aperture to receive the tile at a top end, and to direct the tile under the ground surface through a bottom end.

The tile installation plow may further include a tile cart disposed on the vehicle to hold the tile thereon.

The tile-receiving aperture may receive the tile from the tile cart.

The foregoing and/or other features and utilities of the present general inventive concept may also be achieved by providing a tile installation plow connected to a vehicle to install a tile below a ground surface, the tile installation plow including a main body to be inserted at least partially within the ground surface, a boot disposed on at least a portion of an inner surface of the main body to direct the tile along a portion of the main body under the ground surface, and a dirt remover pivotally disposed on at least a portion of the main body, the dirt remover including a dirt-removing wedge to remove dirt accumulated within the main body, a first hydraulic piston disposed on at least a portion of the main body to move the dirt-removing wedge from up in a first position to down in a second position, and a second hydraulic piston disposed on at least a portion of the dirt-removing wedge to move the dirt-removing wedge in a lateral direction, such that the dirt-removing wedge remains outside the main body in a first lateral position and moves inside the main body in a second lateral position.

The dirt remover may remove dirt from at least one of the main body and an outer surface of the boot.

The foregoing and/or other features and utilities of the present general inventive concept may also be achieved by providing a tile installation plow connected to a vehicle to install a tile below a ground surface, the tile installation plow including a main body to be inserted at least partially within the around surface, a boot disposed on at least a portion of an inner surface of the main body to direct the tile along a portion of the main body under the ground surface, and a dirt remover pivotally disposed on a portion of the main body, the dirt remover including a dirt-removing wedge to remove dirt accumulated within the main body, a first wedge flap disposed on at least a portion of a first edge of the dirt-removing wedge to increase a surface area of the dirt-removing wedge by moving from retracted in a first position to extended in a second position, and a second wedge flap disposed on at least a portion of a second edge of the dirt-removing wedge to increase the surface area of the dirt-removing wedge by moving from retracted in another first position to extended in another second position.

The first wedge flap and the second wedge flap may be removable.

The foregoing and/or other features and utilities of the present general inventive concept may also be achieved by providing a tile installation plow connected to a mechanical arm of a vehicle to install a tile below a ground surface, the tile installation plow including a main body to be inserted at least partially within the ground surface, the main body including a lateral bar, at least one panel disposed on an end of the lateral bar, and a plurality of guard blades removably disposed on at least a portion of an edge of the at least one panel to prevent damage to the at least one panel in response to a movement within the ground surface, a boot disposed on at least a portion of the at least one panel to direct the tile along a portion of the main body under the ground surface, and a tile cart connected to the vehicle to hold the tile thereon.

The at least one panel may include a top portion removably disposed on the lateral bar, and a bottom portion oriented at a downward angle with respect to the top portion, and toward a central point with respect to the lateral bar.

Each of the plurality of guard blades may include a blade portion to break apart dirt, and an attachment portion disposed on at least a portion of the blade portion to connect to the at least one panel.

The main body may further include a stem perpendicularly connected to at least a portion of the lateral bar with respect to a direction to provide a surface area for the mechanical arm to grasp, such that the main body moves in response to a movement of the mechanical arm.

The tile installation plow may further include a hydraulic tile feeder disposed on at least a portion of the main body to move the tile from the tile cart into the boot.

The hydraulic tile feeder may be wirelessly synchronized to a rotation speed of a spool on the tile cart, such that the hydraulic tile feeder adjusts a speed of moving the tile based on the rotation speed of the tile cart.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1A:
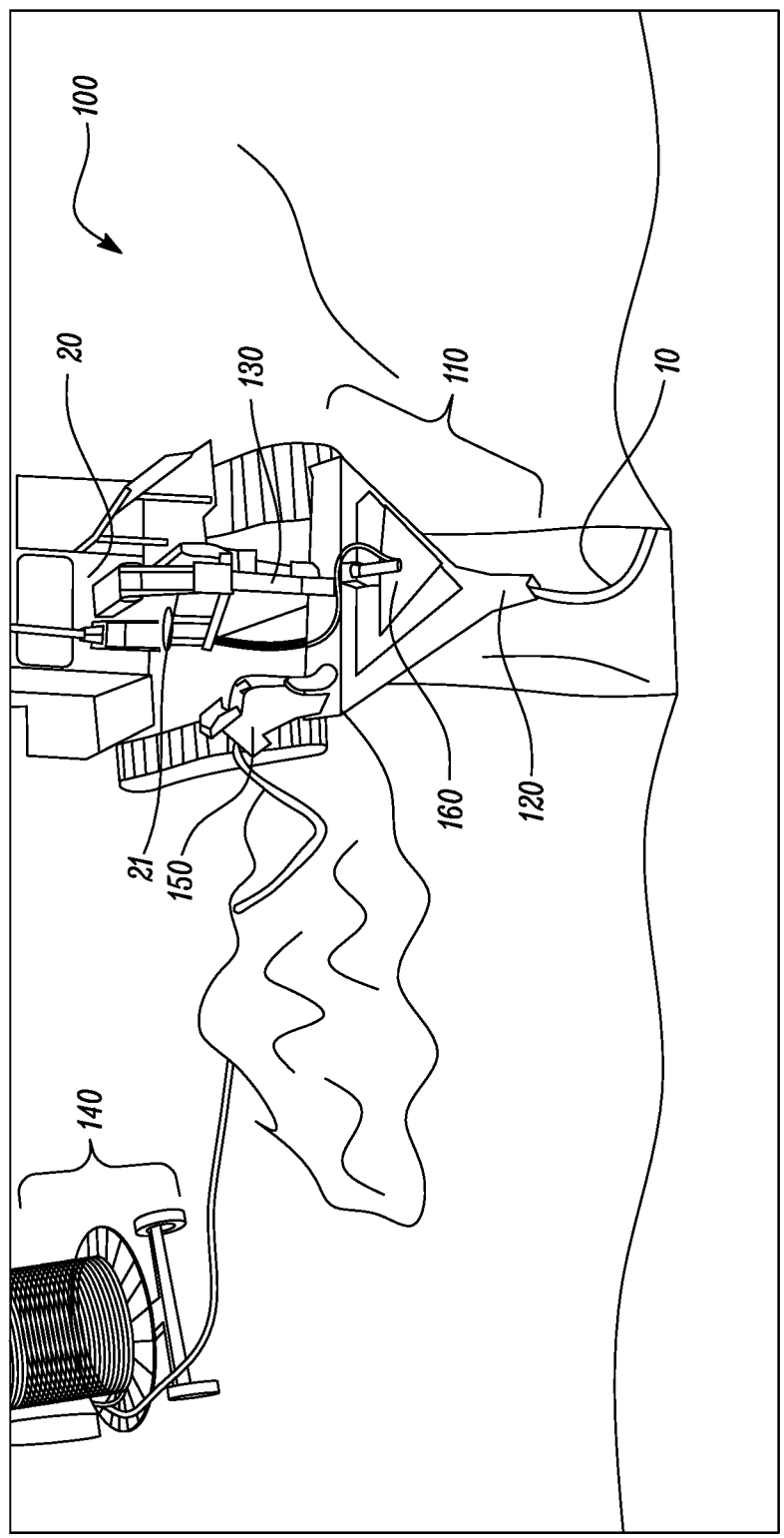
FIG. 1A illustrates an isometric front elevation view of a low disturbance tile installation plow, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

The term "tile" used herein has the same meaning as commonly understood by one of ordinary skill in the art to words and/or phrases such as "tube," "tubing," "pipe," "piping," "hose," "drainage tile," "drainage pipes," "lateral pipe," "main pipe," "seepage lines," "sub irrigation tile," "sub irrigation pipes," "water management system," and/or "controlled drainage system." As such, the meaning of "tile" in the present disclosure as it deviates from a meaning commonly understood by one of ordinary skill, this meaning is to be taken into account in the specific context this definition is given herein.

The phrase "low disturbance the installation plow" used herein has the same meaning as commonly understood by one of ordinary skill in the art to words and/or phrases such as "V Plow," "V Tile Plow," "V drainage plow," "half V," "half V tile plow," "half V drainage plow," "low disturbance plow," "low disturbance tile plow," "steerable V plow," "steerable drainage plow," "contour drainage plow," and/or "sub irrigation plow." As such, the meaning of "low disturbance tile installation plow" in the present disclosure as it deviates from a meaning commonly understood by one of ordinary skill, this meaning is to be taken into account in the specific context this definition is given herein.

LIST OF COMPONENTS

Tile Installation Plow 100
Main Body 110

First Panel 111
Second Panel 112
Lateral Bar 113
First End 113a
Second End 113b
Tile-Receiving Aperture 113c
Plurality of Fasteners 114
Ground-Pulverizing Panel 115
Boot 120
Main Frame 121
At Least One Fastener-Receiving Aperture 121a
Guiding Panel 122
Pathway 123
Guard Panel 125
At Least One Slit 125a
Stem 130
Primary Rod 131
At Least One Support Rod 132
Base 133
Tile Cart 140
Hydraulic Tile Feeder 150
Dirt Remover 160
Dirt-Removing Wedge 161
Wedge-Holding Arm 162
Hydraulic Piston 163
First Hinge 164
Second Hinge 165
Tile Installation Plow 200
Main Body 210
First Panel 211
Top Portion 211a
Bottom Portion 211b
Tile-Receiving Aperture 211c
At Least One Fastener-Receiving Aperture 211d
Second Panel 212
Top Portion 212a
Bottom Portion 212b
At Least One Fastener-Receiving Aperture 212c
Lateral Bar 213
First Attachment Panel 213a
Second Attachment Panel 213b
Tile-Receiving Aperture 213c
Boot 220
Main Frame 221
First Guiding Panel 222
Pathway 223
Second Guiding Panel 224
Guard Panel 225
At Least One Slit 225a
Hydraulic Tile Feeder 250
Dirt-Removing Wedge 261
First Wedge Panel 261a
Second Wedge Panel 261b
Third Wedge Panel 261c
Plurality of Sliding Rails 261d
Tile Installation Plow 300
First Panel 311
Top Portion 311a
Bottom Portion 311b
Tile-Receiving Aperture 311c
At Least One Fastener-Receiving Aperture 311d
Second Panel 312
Top Portion 312a
Bottom Portion 312b
At Least One Fastener-Receiving Aperture 312c
Dirt Remover 360
Dirt-Removing Wedge 361
Wedge-Holding Arm 362
First Hydraulic Piston 363
First Hinge 364
Second Hinge 365
Sliding Bar Holder 366
Bar-Receiving Aperture 366a
Hydraulic Sliding Bar 367
Second Hydraulic Piston 368
Plurality of Hydraulic Cables 369
Tile Installation Plow 400
Main Body 410
Boot 420
Tile-Receiving Aperture 423
Tile Cart 440
Dirt Remover 460
Dirt-Removing Wedge 461
First Wedge Flap 461a
Second Wedge Flap 461b
Plurality of Slits 461c
Plurality of Pins 461d
Wedge-Holding Arm 462
Tile Installation Plow 500
Tile Installation Plow 600
Global Positioning System 670
Control Unit 680
Processor 681
Communication Unit 682
Storage Unit 683
Tile Installation Plow 700
Plurality of Guard Blades 716
Blade Portion 716a
Attachment Portion 716b
At Least One Fastener-Receiving Aperture 716c FIG. 1A illustrates an isometric front elevation view of a low disturbance tile installation plow 100, according to an exemplary embodiment of the present general inventive concept.

Figure 1B:
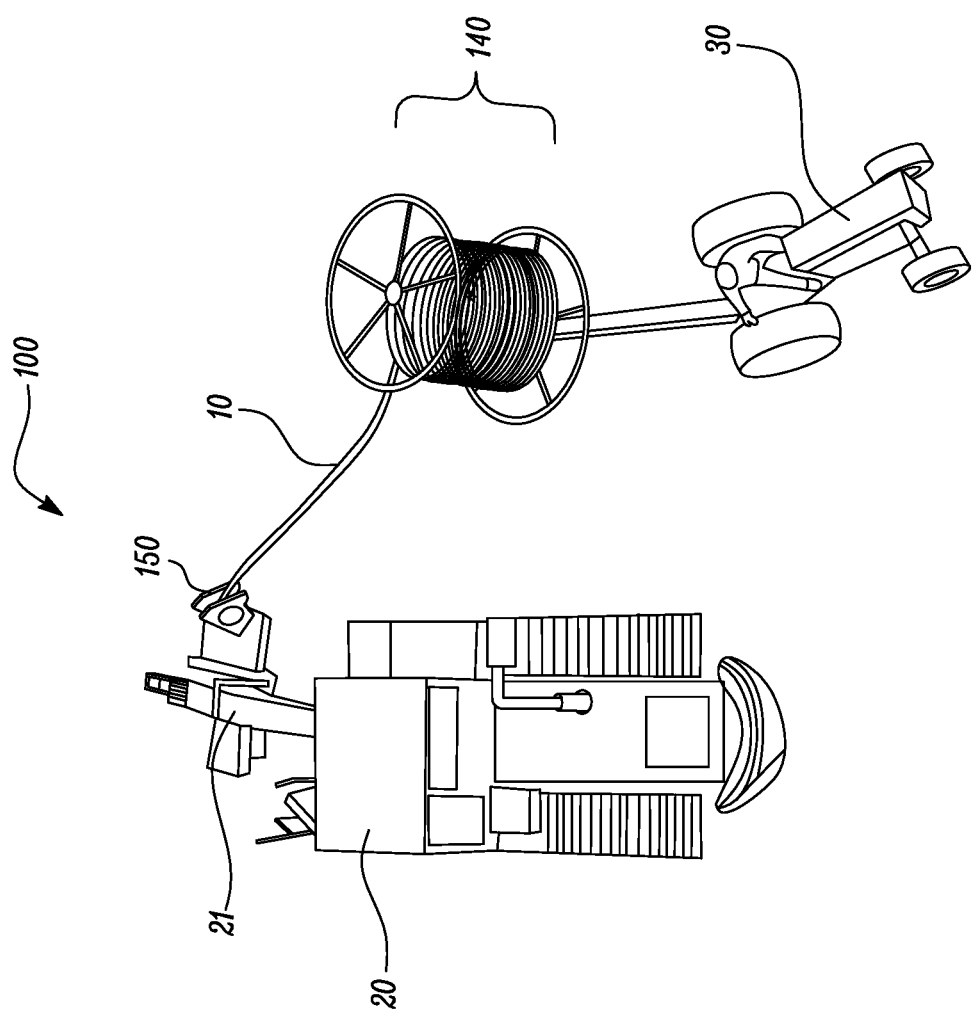
FIG. 1B illustrates a top perspective view of the low disturbance tile installation plow, according to an exemplary embodiment of the present general inventive concept.

FIG. 1B illustrates a top perspective view of the low disturbance tile installation plow 100, according to an exemplary embodiment of the present general inventive concept.

Figure 1C:
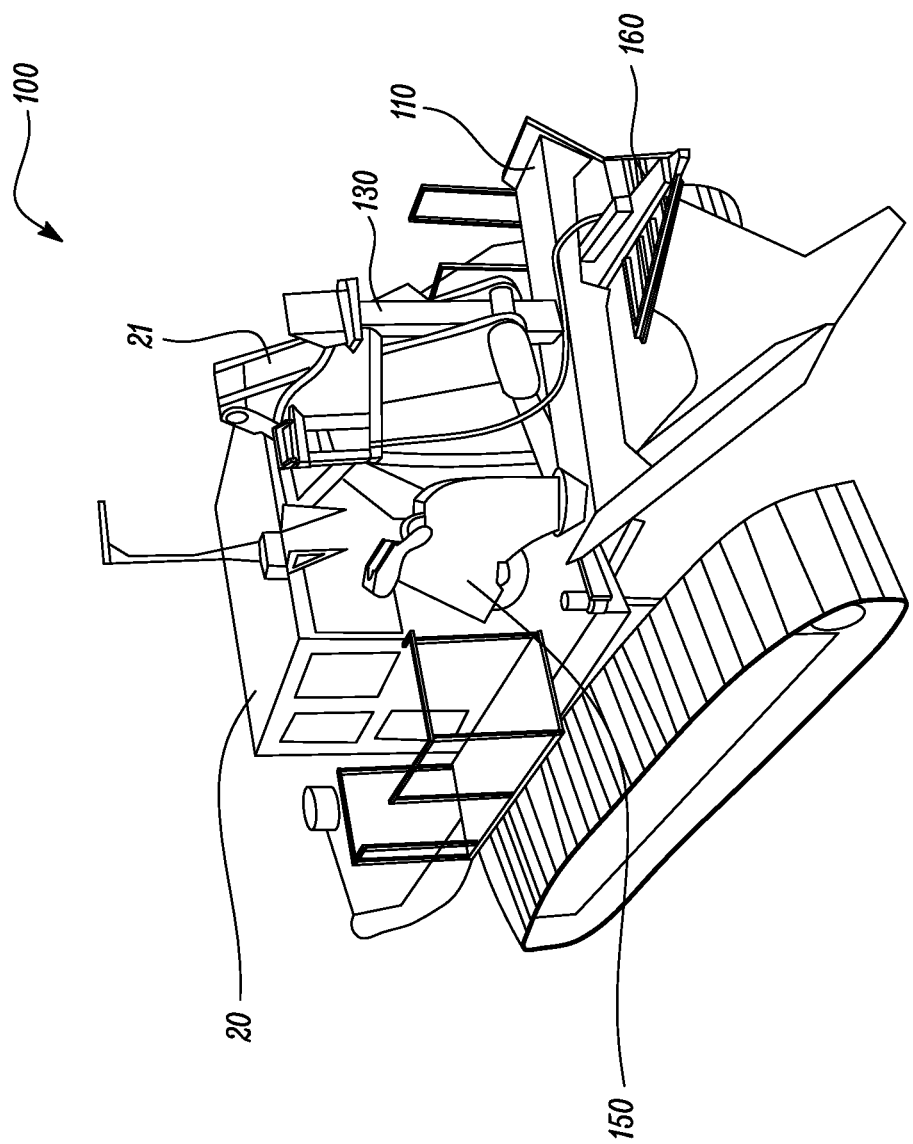
FIG. 1C illustrates an isometric front perspective view of the low disturbance tile installation plow, according to an exemplary embodiment of the present general inventive concept.

FIG. 1C illustrates an isometric front perspective view of the low disturbance tile installation plow 100, according to an exemplary embodiment of the present general inventive concept.

Figure 1D:
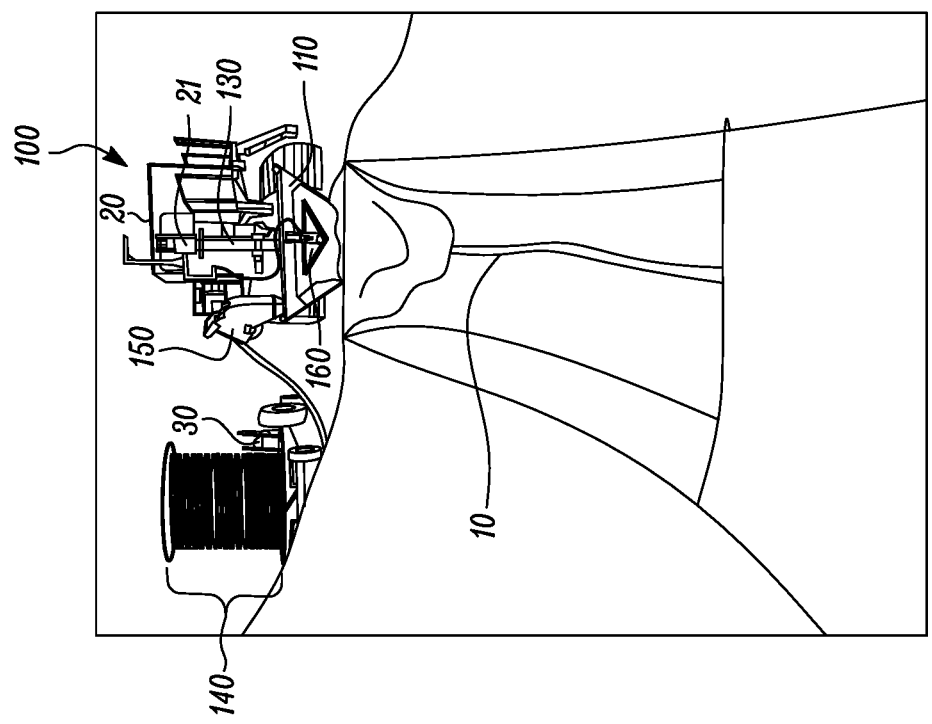
FIG. 1D illustrates a front perspective view of the low disturbance tile installation plow, according to an exemplary embodiment of the present general inventive concept.

FIG. 1D illustrates a front perspective view of the low disturbance tile installation plow 100, according to an exemplary embodiment of the present general inventive concept.

In a first embodiment, the low disturbance tile installation plow 100 (i.e. V tile plow), and all components thereof, may be constructed from at least one of metal, plastic, wood, glass, and rubber, etc., but is not limited thereto. For example, the material may include A514 steel to ensure the thinnest possible low disturbance tile installation plow 100.

The low disturbance the installation plow 100 may include a main body 110, a boot 120, a stem 130, a tile cart 140, a hydraulic tile feeder 150, and a dirt remover 160, but is not limited thereto.

The hydraulic the feeder 150 may be disposed on at least a portion of the main body 110. The hydraulic tile feeder 150 may include a hydraulic motor disposed therein to move (i.e, push and/or pull) a tile 10 within the hydraulic tile feeder 150. Moreover, the motor of the hydraulic tile feeder 150 may be wirelessly synchronized to a rotation speed of a spool on the tile cart 140, such that the hydraulic tile feeder 150 may reduce and/or increase speed of pushing and/or pulling the tile 10 based on the rotation speed of the tile cart 140.

Referring to FIGS. 1A through 1D, the main body 110 may be inserted into the ground using a mechanical arm 21 on a vehicle 20. The boot 120 may be disposed on at least a portion of the main body 110. The tile cart 140 may be connected to a vehicle 30 and moved by the vehicle 30 near the vehicle 20. The tile cart 140 may hold and/or organize the tile 10 thereon. Moreover, the tile 10 may be retrieved from the tile cart 140 to be inserted into a top end of the hydraulic tile feeder 150, such that the tile 10 may be extracted from a bottom end of the boot 120 and placed below the ground surface.

Therefore, the present general inventive concept may include the tile installation plow 100 removably connected to the vehicle 20 to install the tile 10 below the around surface. The tile installation plow 100 may include the main body 110 to be inserted at least partially within the ground surface and the hydraulic tile feeder 150 disposed on a portion of the main body 110 to direct the tile 10 through a portion of the main body 110.

Figure 2A:
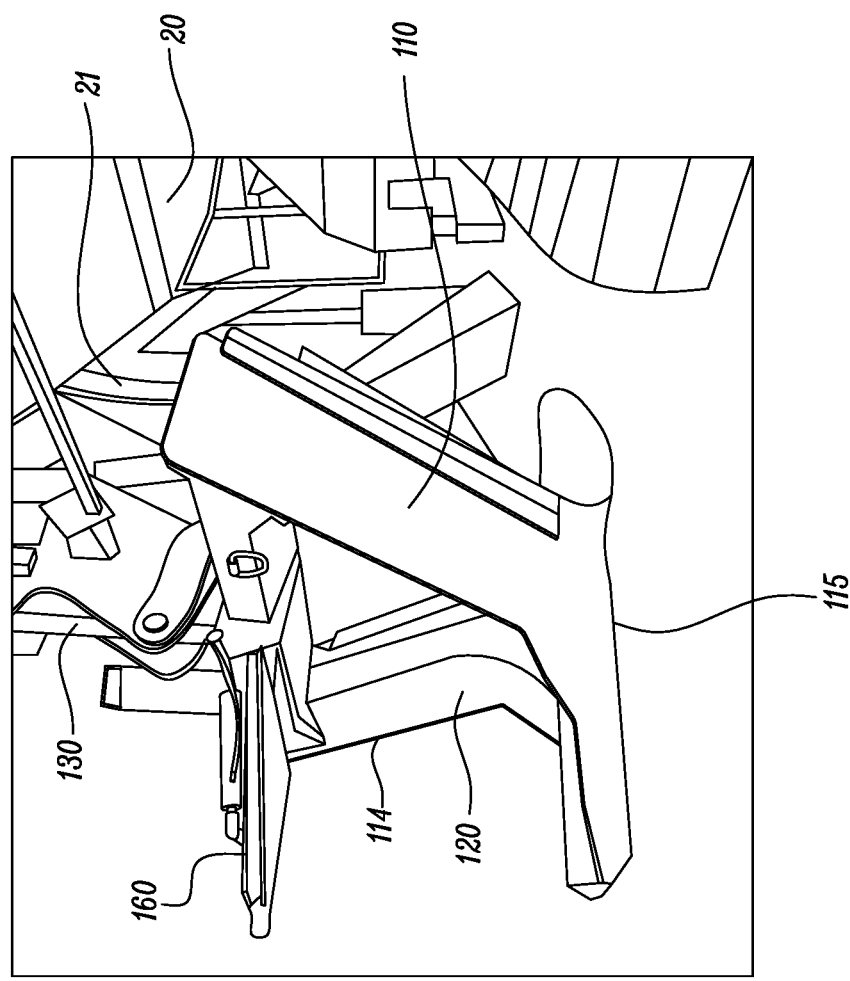
FIG. 2A illustrates a front perspective view of a boot disposed on an inner surface of a first panel of a main body as disposed on a vehicle, according to an exemplary embodiment of the present general inventive concept.

FIG. 2A illustrates a front perspective view of a boot 120 disposed on an inner surface of a first panel 111 of the main body 110 as disposed on a vehicle 20, according to an exemplary embodiment of the present general inventive concept.

Figure 2B:
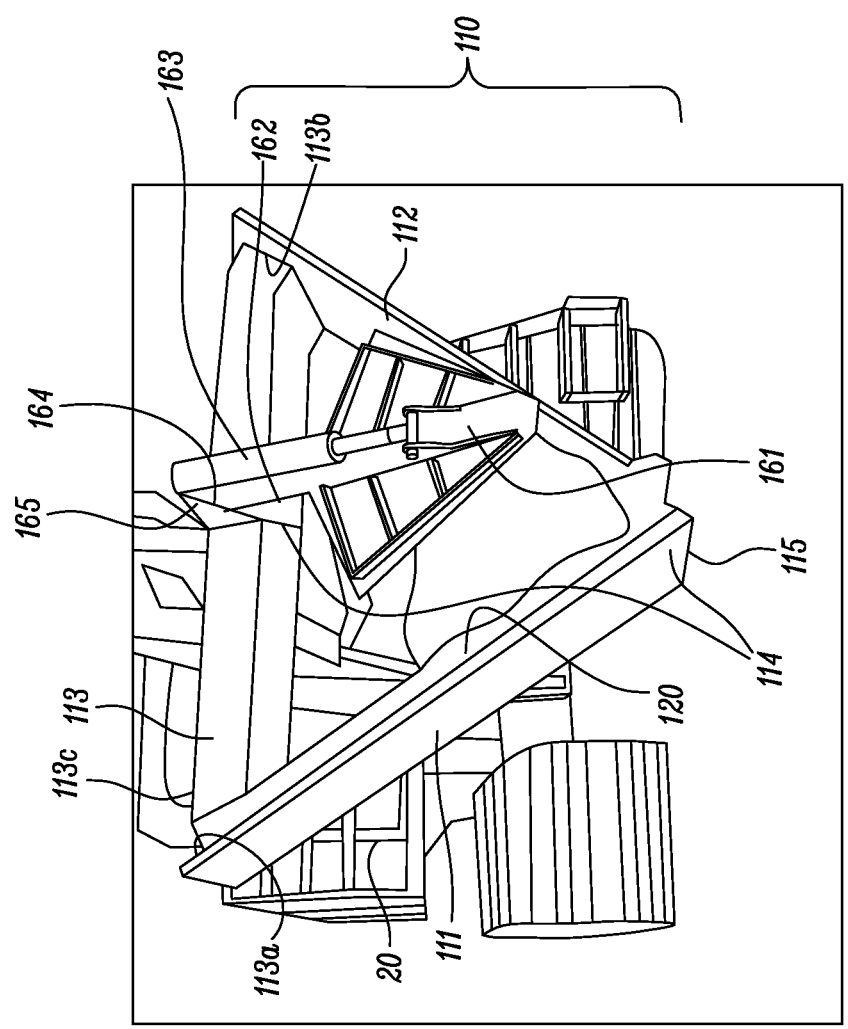
FIG. 2B illustrates a front perspective view of the boot disposed on the inner surface of the first panel of the main body as disposed on the vehicle, according to an exemplary embodiment of the present general inventive concept.

FIG. 2B illustrates a front perspective view of the boot 120 disposed on the inner surface of the first panel 111 of the main body 110 as disposed on the vehicle 20, according to an exemplary embodiment of the present general inventive concept.

The main body 110 may include a first panel 111, a second panel 112, and a lateral bar 113, a plurality of fasteners 114, and a ground-pulverizing panel 115, but is not limited thereto.

The lateral bar 113 may include a first end 113a, a second end 113b, and a tile-receiving aperture 113c, but is not limited thereto.

The plurality of fasteners 114 may include a soldered joint, a glued joint, a screw, a nail, a bolt, a nut, a washer, and/or any combination thereof, but is not limited thereto.

Referring to FIGS. 2A and 2B, the main body 110 is illustrated to have a V-prism shape or a triangular prism shape. However, the main body 110 may be a square prism, a rectangular prism, a circular prism, a pentagonal prism, a hexagonal prism, an octagonal prism, or any other shape known to one of ordinary skill in the art, but is not limited thereto.

At least a portion of a top edge of the first panel 111 may be disposed on the first end 113a of the lateral bar 113. At least a portion of a top edge of the second panel 112 may be disposed on the second end 113b of the lateral bar 113. The first panel 111 may be oriented at a downward angle toward a central point (i.e. a center point) with respect to the lateral bar 113. Similarly, the second panel 112 may be oriented at a downward angle toward the central point with respect to the lateral bar 113. Concordantly, at least a bottom edge of the first panel 111 and at least a bottom edge of the second panel 112 may be connected using the plurality of fasteners 114 at the central point via the ground-pulverizing panel 115.

Referring to FIGS. 1A and 2B, alternatively, the tile 10 may be inserted into the tile-receiving aperture 113c, such that the tile 10 moves through the top end of the boot 120 and extends out through a bottom end of the boot 120. The tile 10 may protrude from the boot 120, such that at least a portion of the tile 10 is laid under a ground surface (i.e. underground).

The ground-pulverizing panel 115 may perpendicularly partially protrude a predetermined length outward away from both side edges of the first panel 111 and both side edges of the second panel 112 with respect to the first panel 111 and the second panel 112, respectively. The ground surface may move and/or break apart in response to the ground-pulverizing panel 115 being pushed and/or pulled by the vehicle 20 when the main body 110 is inserted below the ground surface.

Furthermore, the ground surface may move and/or break apart in response to the first panel 111 and the second panel 112 being pushed and/or pulled by the vehicle 20 when the main body 110 is inserted below the around surface. Moreover, the first panel 111 and the second panel 112 may prevent substantial disturbance of any dirt below the ground surface due to a narrow surface area of the first panel 111 and a narrow surface area of the second panel 112 contacting the ground surface. Additionally, the orientation of the first panel 111 and the orientation of the second panel 112 may direct any dirt and/or soil collected therein towards at least the bottom edge of the first panel 111 and the bottom edge of the second panel 112.

Referring to FIGS. 2A and 2B, the stem 130 is illustrated to have a substantially rectangular prism shape. However, the stem 130 may be a square prism, a circular prism, a pentagonal prism, a hexagonal prism, an octagonal prism, or any other shape known to one of ordinary skill in the art, but is not limited thereto. Moreover, the stem 130 may be a plurality of the stem 130, such that a mechanical arm 21 of vehicle 20 may grasp the plurality of the stem 130.

Referring to FIGS. 2A and 2B, the dirt remover 160 may include a dirt-removing wedge 161, a wedge-holding arm 162, a hydraulic piston 163, a first hinge 164, and a second hinge 165, but is not limited thereto.

The dirt remover 160 may be disposed on at least a portion of an outer surface of the lateral bar 113. The dirt-removing wedge 161 and the wedge-holding arm 162 may pivot on the first hinge 164 in response to a user activating the hydraulic piston 163 from the vehicle 20 that pivots on the second hinge 165, such that the dirt-removing wedge 160 moves in a first direction or second direction from a first position (i.e. up) to a second position (i.e. down) and pushes and/or pulls any dirt that has accumulated within the main body 110.

The stem 130 may provide a surface area for the mechanical arm 21 to grasp. Additionally, the mechanical arm 21 may pivot the stem 130, such that the main body 110 may pivot towards the vehicle 20 and/or away from the vehicle 20. Furthermore, the mechanical arm 21 may rotate in a first direction (i.e. clockwise) or a second direction (i.e. counterclockwise), such that the main body 110 rotates in response thereto.

Therefore, the present general inventive concept may include the tile installation plow 100 to install the tile 10 below the ground surface. The tile installation plow 100 may include the main body 110 to be inserted at least partially within the ground surface. The main body 110 may include the lateral bar 113 including the first end 113a and the second end 113b, the first panel 111 may be disposed on the first end 113a and may be oriented toward the center point below the lateral bar 113, and the second panel 112 may be disposed on the second end and may be oriented toward the center point to connect to the first panel 111. Moreover, the tile installation plow 100 may further include the boot 120 disposed on a portion of the inner surface of the first panel 111 to direct the tile 10 along the first panel 111 to below the ground surface.

Also, the present general inventive concept may include the tile installation plow 100 removably connected to the mechanical arm 21 of the vehicle 20 to install the tile 10 below the ground surface. The tile installation plow 100 may include the main body 110 to be inserted at least partially within the ground surface. The main body 110 may include the lateral bar 113, and the stem 130 connected to a portion of the lateral bar 113 to provide a surface for the mechanical arm 21 to grasp, such that the main body 110 moves in response to the movement of the mechanical arm 21. Moreover, the tile installation plow 100 may further include the boot 120 disposed on a portion of a length of the main body 110 to direct the tile 10 below the ground surface.

Also, the present general inventive concept may include the tile installation plow 100 to install the tile 10 below the ground surface. The tile installation plow 100 may include the main body 110 to be inserted at least partially within the ground surface and the dirt remover 160 pivotally disposed on a portion of the main body 110 to remove dirt accumulated within the main body 110, such that the dirt remover 160 stays up in the first position and pivots at least partially down in the second position.

Also, the present general inventive concept may include the tile installation plow 100 to install the tile 10 below the ground surface including the vehicle 20 and the vehicle 30. The tile installation plow 100 may include the main body 110 removably connected to the vehicle 20 to be inserted at least partially within the ground surface and the tile cart 140 removably connected to the vehicle 30 to hold the tile 10.

Figure 3A:
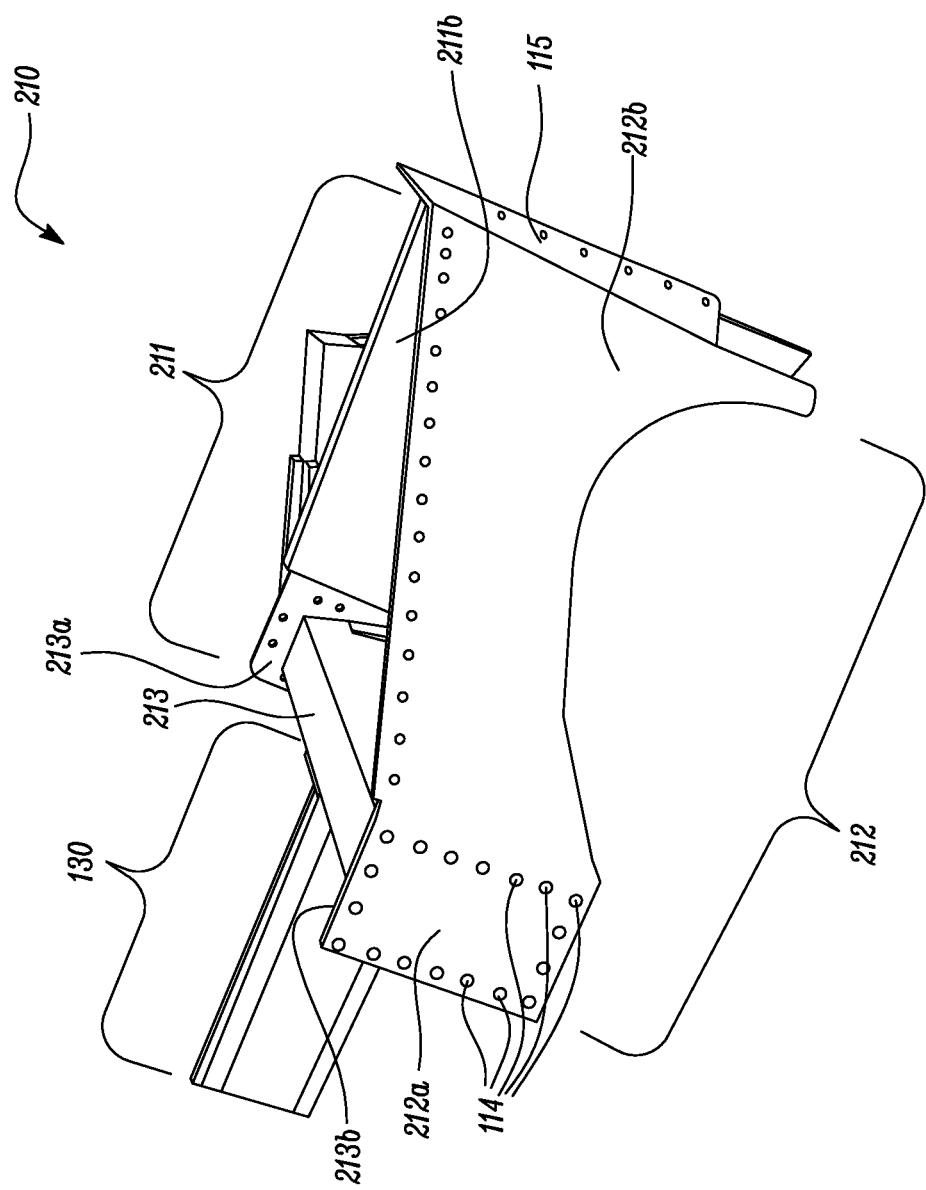
FIG. 3A illustrates a side perspective rear view of the main body, according to another exemplary embodiment of the present general inventive concept.

FIG. 3A illustrates a side perspective rear view of a main body 210, according to another exemplary embodiment of the present general inventive concept.

Figure 3B:
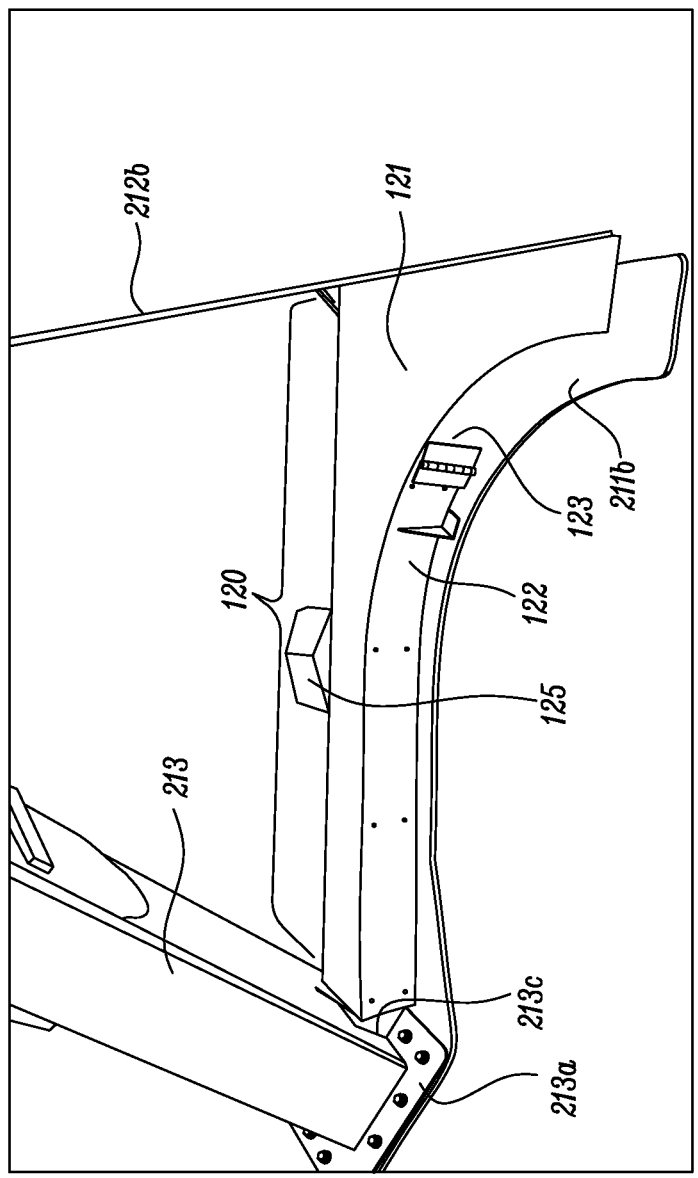
FIG. 3B illustrates a zoomed in front view of the boot disposed on an inner surface of a first panel of the main body, according to another exemplary embodiment of the present general inventive concept.

FIG. 3B illustrates a zoomed in front view of the boot 120 disposed on an inner surface of a first panel 211 of the main body 210, according to another exemplary embodiment of the present general inventive concept.

Figure 3C:
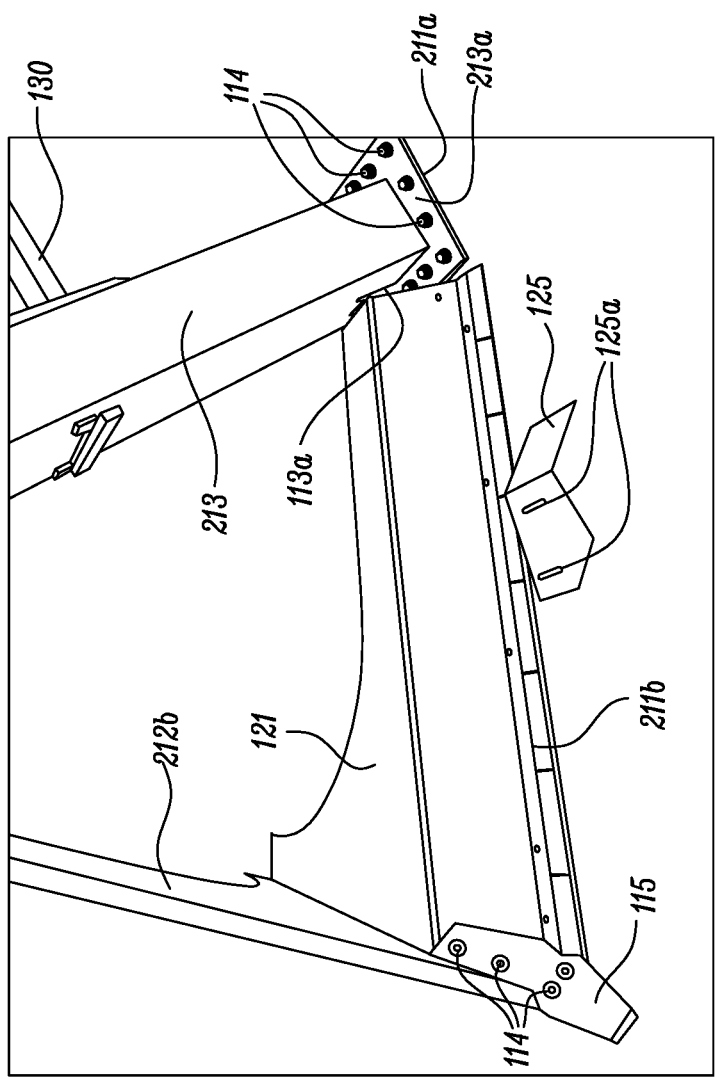
FIG. 3C illustrates a zoomed in rear view of the boot disposed on the inner surface of the first panel of the main body, according to another exemplary embodiment of the present general inventive concept.

FIG. 3C illustrates a zoomed in rear view of the boot 120 disposed on the inner surface of the first panel 211 of the main body 210, according to another exemplary embodiment of the present general inventive concept.

Figure 3D:
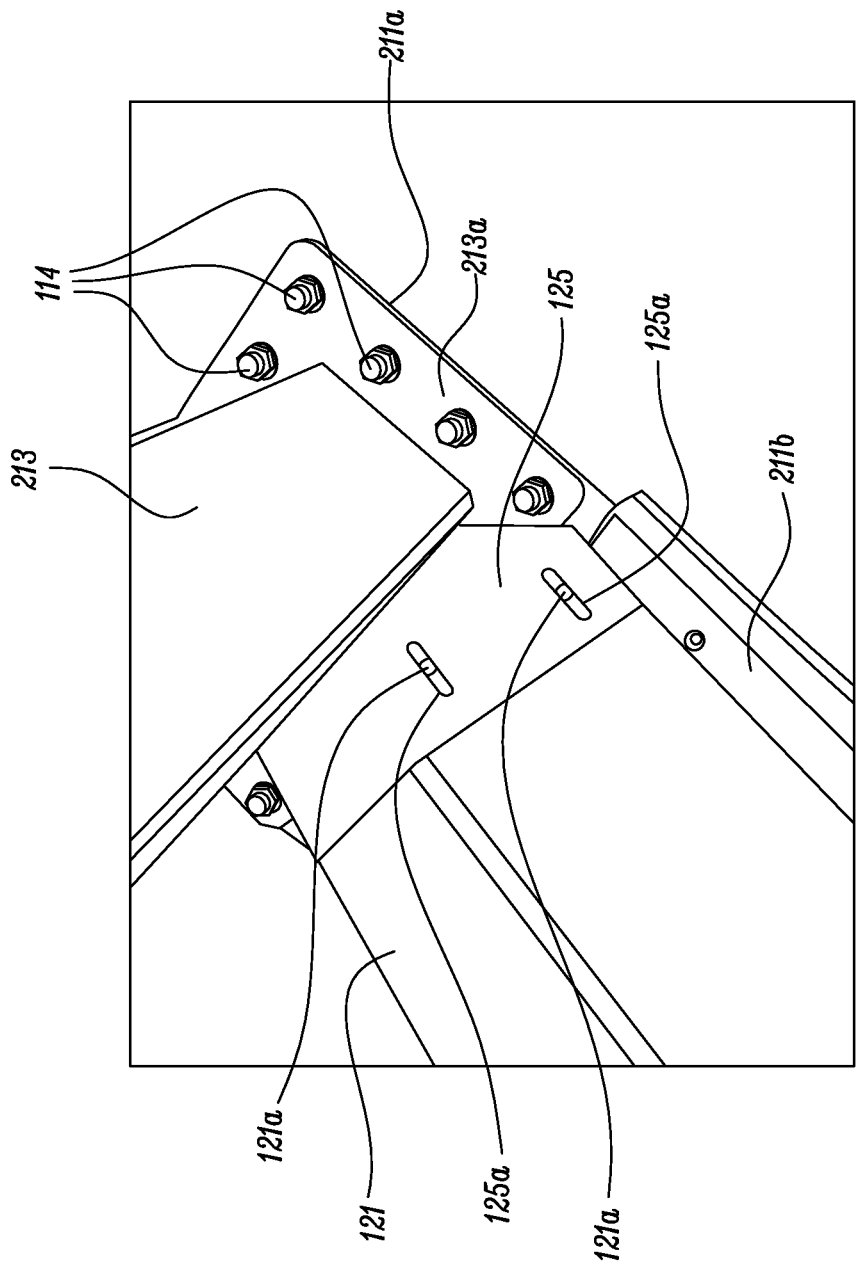
FIG. 3D illustrates a zoomed in view of a guard panel connected to the boot disposed on the inner surface of the first panel of the main body, according to another exemplary embodiment of the present general inventive concept.

FIG. 3D illustrates a zoomed in view of a guard panel connected to the boot 120 disposed on the inner surface of the first panel 211 of the main body 210, according to another exemplary embodiment of the present general inventive concept.

Figure 4A:
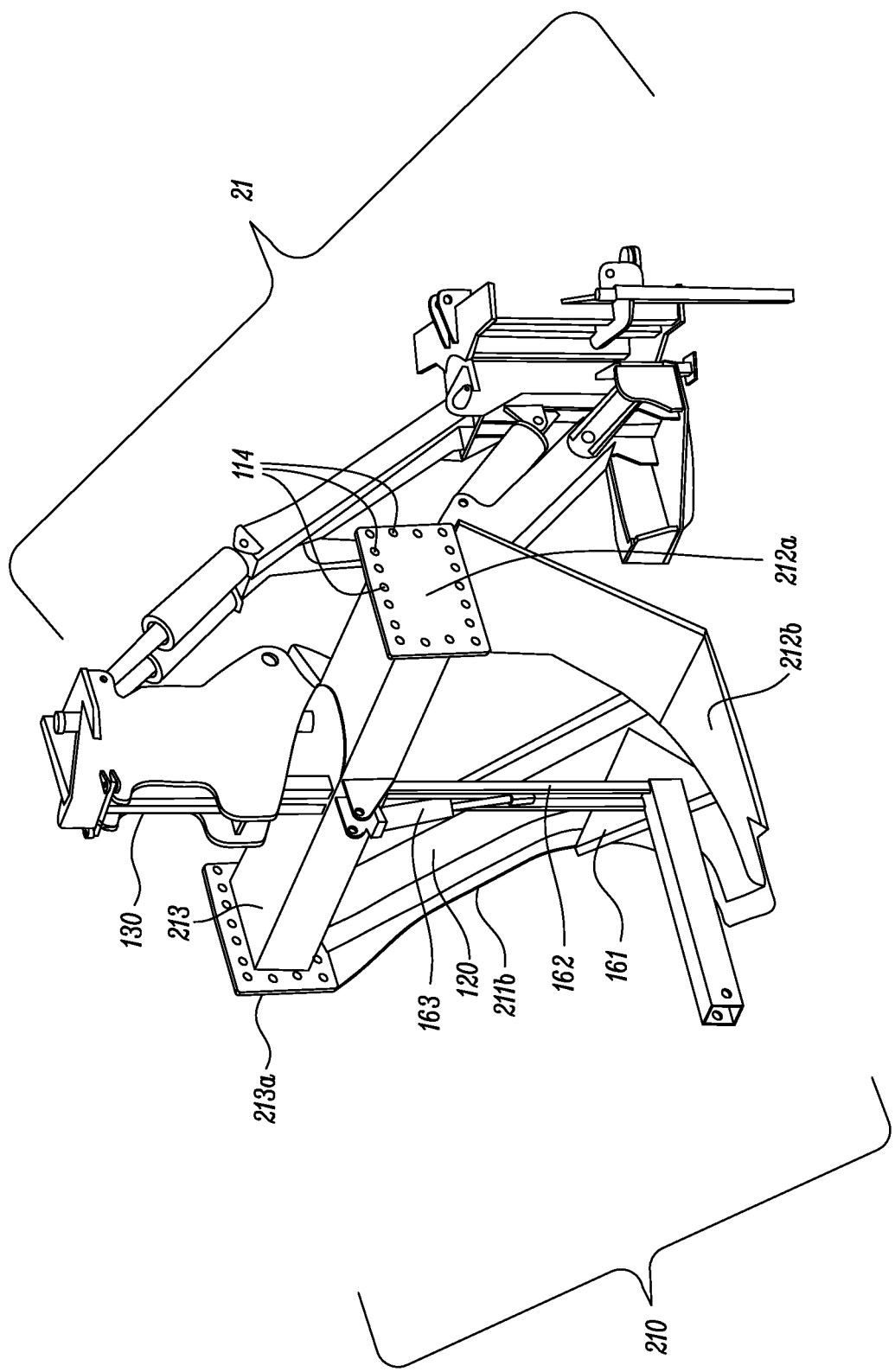
FIG. 4A illustrates an isometric front perspective view of the boot disposed on the inner surface of the first panel of the main body as disposed on a mechanical arm, according to another exemplary embodiment of the present general inventive concept.

FIG. 4A illustrates an isometric front perspective view of the boot 120 disposed on the inner surface of the bottom portion 211b of the first panel 211 of the main body 210 as disposed on the mechanical arm 21, according to another exemplary embodiment of the present general inventive concept.

Figure 4B:
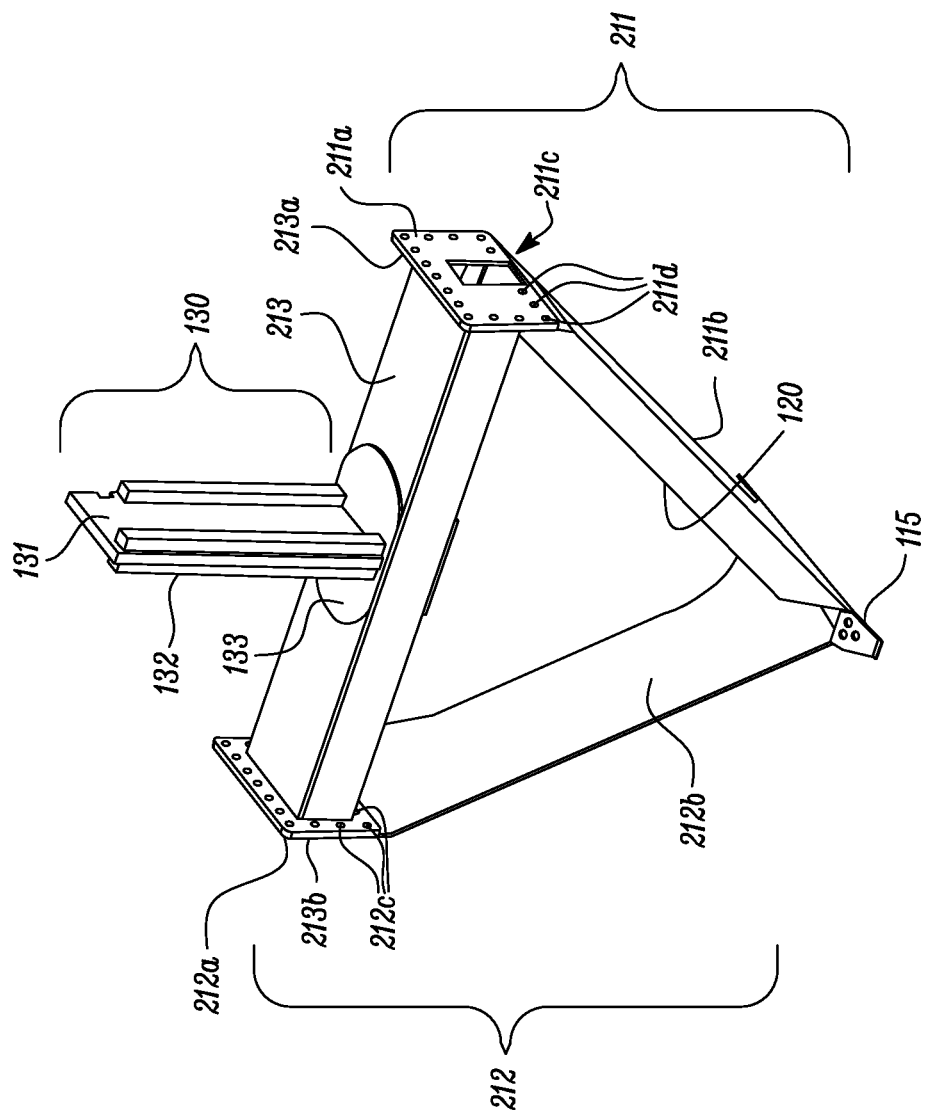
FIG. 4B illustrates an isometric rear perspective view of the boot disposed on the inner surface of the first panel of the main body, according to another exemplary embodiment of the present general inventive concept.

FIG. 4B illustrates an isometric rear perspective view of the boot 120 disposed on the inner surface of the bottom portion 211b of the first panel 211 of the main body 210, according to another exemplary embodiment of the present general inventive concept.

Referring to FIGS. 3A through 3D, in a second embodiment, the main body 210 may include a first panel 211, a second panel 212, and a lateral bar 213, the plurality of fasteners 114, and the ground-pulverizing panel 115, but is not limited thereto.

The first panel 211 may include a top portion 211a, a bottom portion 211b, a tile-receiving aperture 211c, and at least one fastener-receiving aperture 211d, but is not limited thereto.

The second panel 212 may include a top portion 212a, a bottom portion 212b, and at least one fastener-receiving aperture 212c, but is not limited thereto.

The lateral bar 213 may include a first attachment panel 213a, a second attachment panel 213b, and a tile-receiving aperture 213c, but is not limited thereto.

The stem 130 may include a primary rod 131, at least one support rod 132, and a base 133, but is not limited thereto.

Referring to FIG. 3A, the main body 210 is illustrated to have a V-prism shape or a triangular prism shape. However, the main body 210 may be a square prism, a rectangular prism, a circular prism, a pentagonal prism, a hexagonal prism, an octagonal prism, or any other shape known to one of ordinary skill in the art, but is not limited thereto.

The at least one fastener-receiving aperture 211d may be disposed at any feasible location on the first panel 211. The at least one fastener-receiving aperture 212c may be disposed at any feasible location on the second panel 212.

Referring to FIGS. 4A and 4B, at least a portion of the top portion 211a of the first panel 211 may be disposed on the first attachment panel 213a of the lateral bar 213. Specifically, at least one of the plurality of fasteners 114 may be inserted into the at least one fastener-receiving aperture 211d of the top portion 211a of the first panel 211 to the first attachment panel 213a of the lateral bar 213. At least a portion of the top portion 212a of the second panel 212 may be disposed on the second attachment panel 213b of the lateral bar 213. Specifically, at least one of the plurality of fasteners 114 may be inserted into the at least one fastener-receiving aperture 212c of the top portion 212a of the second panel 212 to the second attachment panel 213b of the lateral bar 213. The bottom portion 211b of first panel 211 may be oriented at a downward angle with respect to the top portion 211a, and toward a central point with respect to the lateral bar 213. Similarly, the bottom portion 212b of the second panel 212 may be oriented at a downward angle with respect to the top portion 212a, and toward the central point with respect to the lateral bar 213. Concordantly, at least an edge of the bottom portion 211b of the first panel 211 and at least an edge of the bottom portion 212b of the second panel 212 may be connected using the plurality of fasteners 114 at the central point via the ground-pulverizing panel 115.

Referring to FIG. 3B, the boot 120 may include a main frame 121, a guiding panel 122, a pathway 123, and a guard panel 125, but is not limited thereto.

The guard panel 125 may include at least one slit 125a, but is not limited thereto.

Referring to FIGS. 3B through 3D, although, the boot 120 is disposed on at least a portion of the inner surface of the bottom portion 211b of the first panel 211, alternatively, the boot 120 may be disposed on at least a portion of an inner surface of the bottom portion 212b of the second panel 212, but is not limited thereto.

The boot 120 may be partially shaped similar to at least a portion of the bottom portion 211b of the first panel 211. Specifically, the plurality of fasteners 114 may affix and/or adhere the main frame 121 to at least a portion of the bottom portion 211b of the first panel 211. As such, a combination of the boot 120 and the bottom portion 211b of the first panel 211 may form an enclosed space under the main frame 121.

Referring to FIGS. 1A and 3B, the tile 10 may be inserted into the tile-receiving aperture 213c as received from a bottom portion of the hydraulic tile feeder 150, such that the tile 10 moves through a top end of the pathway 123 and extends out through a bottom end of the pathway 123. Additionally, the guiding panel 122 may at least partially protect the tile 10 within at least an interior portion of the pathway 123. The tile 10 may protrude from the boot 120, such that at least a portion of the tile 10 may be placed below the ground surface.

Referring to FIGS. 1A and 4B, alternatively, the tile 10 may be inserted into the tile-receiving aperture 211c, such that the tile 10 moves through the top end of the boot 120 and extends out through a bottom end of the boot 120. The tile 10 may protrude from the boot 120, such that at least a portion of the tile 10 is placed below the ground surface.

Referring to FIG. 3D, the guard panel 125 may be affixed and/or adhered to the main frame 121 at the at least one slit 125a. Specifically, the plurality of fasteners 114 may be inserted into the at least one slit 125a and the at least one fastener-receiving aperture 121a on the main frame 121. In other words, the at least one fastener-receiving aperture 121a on the main frame 121 may receive at least one of the plurality of fasteners 114. As such, the guard panel 125 may protect excess dirt and/or soil from the underground from contacting the tile 10 and causing at least partial damage thereto.

Referring to FIG. 4B, the base 133 of the stem 130 may be connected to at least a portion of the lateral bar 213. Specifically, the plurality of fasteners 114 may be used to affix and/or adhere the base 133 to at least a portion of the lateral bar 213. Moreover, the mechanical arm 21 may grasp the primary rod 131 and the at least one support rod 132 to manipulate the main body 210.

Referring to FIGS. 1A, 4A, and 4B, additionally, the mechanical arm 21 may pivot the stem 130, such that the main body 210 may pivot towards the vehicle 20 and/or away from the vehicle 20. Furthermore, the mechanical arm 21 may rotate in the first direction or the second direction, such that the main body 210 rotates in response thereto.

Figure 5:
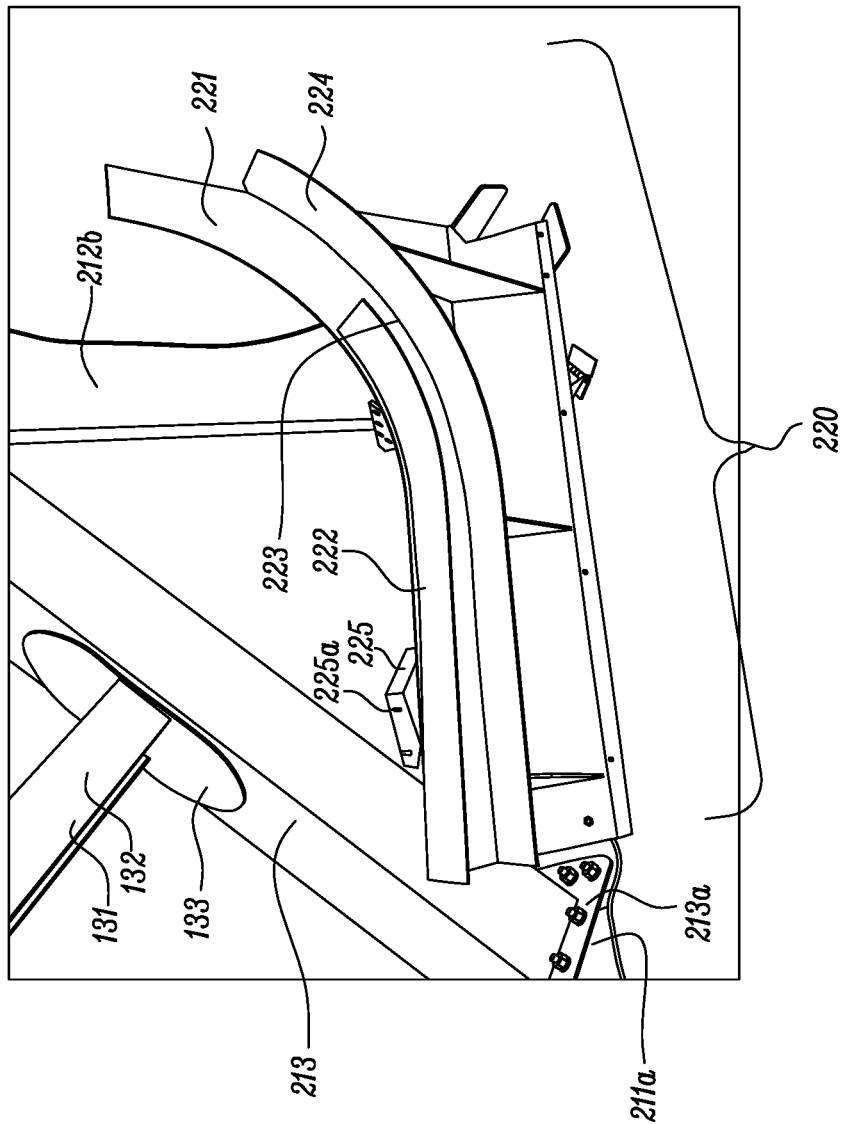
FIG. 5 illustrates a zoomed in front view of a boot and a main body, according to another exemplary embodiment of the present general inventive concept.

FIG. 5 illustrates a zoomed in front view of a boot 220 and a main body 210, according to another exemplary embodiment of the present general inventive concept.

In a third embodiment, the boot 220 may include a main frame 221, a first guiding panel 222, a pathway 223, a second guiding panel 224, and a guard panel 225, but is not limited thereto.

The boot 220 may be removably connected to the main body 210. Specifically, the boot 220 may be removably connected to at least one of the inner surface of the first panel 211 and the second panel 212, but is not limited thereto. Furthermore, the boot 220 may be customized to have at least one of a different size and/or a different shape. In other words, a portion of the boot 220 may be changed based on the user's preferences and/or the entirety of the boot 220 may be changed.

The guard panel 225 may include at least one slit 225a, but is not limited thereto.

Referring to FIGS. 3B through 3D and FIG. 5, similar to the boot 120, the boot 220 may be partially shaped similar to at least a portion of the bottom portion 211b of the first panel 211 or at least a portion of the bottom portion 212b of the second panel 212. Moreover, the plurality of fasteners 114 may affix and/or adhere the main frame 221 to at least a portion of the bottom portion 211b of the first panel 211 or at least a portion of the bottom portion 212b of the second panel 212. As such, a combination of the boot 220 and the bottom portion 211b of the first panel 211 may form an enclosed space under the main frame 221.

Referring to FIGS. 1A and 5, the boot 220 may be installed on at least a portion of the bottom portion 211b of the first panel 211. Subsequently, a tile 10 may be inserted into the tile-receiving aperture 213c, such that the tile 10 moves through a top end of the pathway 223 and extends out through a bottom end of the pathway 223. Additionally, the first guiding panel 222 and/or the second guiding panel 224 may at least partially protect the tile 10 within at least an interior portion of the pathway 223. The tile 10 may protrude from the boot 220, such that at least a portion of the tile 10 is laid under the ground surface.

Referring to FIG. 5, the guard panel 225 may be affixed and/or adhered to the main frame 221 at the at least one slit 225a. Specifically, the plurality of fasteners 114 may be inserted into the at least one slit 225a and the at least one fastener-receiving aperture 221a on the main frame 221. In other words, the at least one fastener-receiving aperture 221a on the main frame 221 may receive at least one of the plurality of fasteners 114. As such, the guard panel 225 may prevent excess dirt and/or soil from the underground from entering the pathway 223 and/or contacting the tile 10 and causing at least partial damage thereto.

The removability of the boot 220 may enhance portability of the combination of the boot 220 and the main body 210 because instead of shipping a large plow structure, the components may be shipped separately. As such, a manufacturer and/or an owner can save on shipping costs.

Therefore, the present general inventive concept may include a tile installation plow 200 to install the tile 10 below the ground surface. The tile installation plow 200 may include the main body 210 to be inserted at least partially within the ground surface. The main body 210 may include the first panel 211 to till dirt, and the second panel 212 may be connected to the first panel 211 to till dirt. The tile installation plow 200 may further include the boot 220 may be removably connected to at least one of the inner surface of the first panel 211 and the inner surface of the second panel 212 to direct the tile 10 below the ground surface.

Also, the present general inventive concept may include a tile installation plow 200 to install the tile 10 below the ground surface. The tile installation plow 200 may include the main body 210 to be inserted at least partially within the ground surface and the boot 220 may be removably connected to the main body 210 to direct the tile 10 below the ground surface, such that a portion of the boot 220 may be changed in at least one of a size and a shape.

Figure 6:
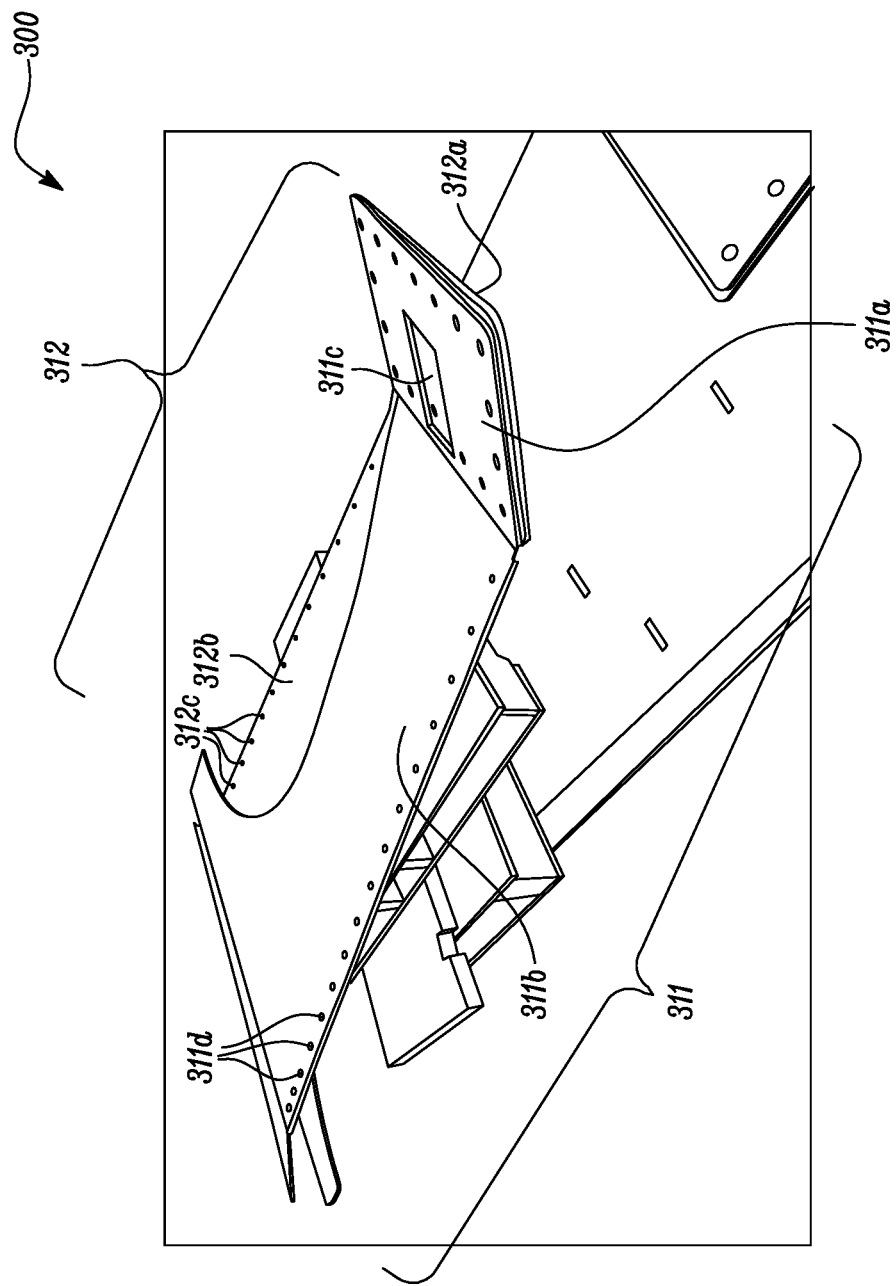
FIG. 6 illustrates an isometric front perspective view of a first panel and a second panel, according to another exemplary embodiment of the present general inventive concept.

FIG. 6 illustrates an isometric front perspective view of a first panel 311 and a second panel 312, according to another exemplary embodiment of the present general inventive concept.

In a fourth embodiment, the first panel 311 may include a top portion 311a, a bottom portion 311b, a tile-receiving aperture 311c, and at least one fastener-receiving aperture 311d, but is not limited thereto.

The second panel 312 may include a top portion 312a, a bottom portion 312b, and at least one fastener-receiving aperture 312c, but is not limited thereto.

The at least one fastener-receiving aperture 311d may be disposed at any feasible location on the first panel 311. The at least one fastener-receiving aperture 312c may be disposed at any feasible location on the second panel 312.

Referring to FIGS. 3A through 4B and FIG. 6, the first panel 311 and the second panel 312 may be constructed similarly to the first panel 211 and the second panel 212, respectively. However, the first panel 311 and the second panel 312 may be removable and at least one panel of alternative design and/or at least one panel of alternative function may be substituted instead. Moreover, the first panel 311 and the second panel 312 may be constructed with other similar pieces used to construct an apparatus similar to the main body 210. In other words, the first panel 311 may be connected to at least a portion of an object, such as a portion of the vehicle 20 and/or a portion of the main body 210.

As such, the first panel 311 and the second panel 312 may be retrofit onto any vehicle and/or be customized with any size object and/or any combination of components. As such, the first panel 311 and the second panel 312 may be portable and easily disassembled and/or reconstructed based on needs of the user. In other words, the first panel 311 and/or the second panel 312 may removably connect to a portion of the main body 210, such that the main body 210 may be changed in at least one of a size and a shape.

Referring to FIGS. 3A through 4B and FIG. 6, for example, the lateral bar 213 may be affixed and/or adhered to the first panel 311 and the second panel 312. Specifically, at least a portion of the top portion 311a of the first panel 311 may be disposed on the first attachment panel 213a of the lateral bar 213. Specifically, at least one of the plurality of fasteners 114 may be inserted into the at least one fastener-receiving aperture 311d of the top portion 311a of the first panel 311 to the first attachment panel 213a of the lateral bar 213. At least a portion of the top portion 312a of the second panel 312 may be disposed on the second attachment panel 213b of the lateral bar 213. Specifically, at least one of the plurality of fasteners 114 may be inserted into the at least one fastener-receiving aperture 312c of the top portion 312a of the second panel 312 to the second attachment panel 213b of the lateral bar 213. The bottom portion 311b of first panel 311 may be oriented at a downward angle with respect to the top portion 311a, and toward a central point with respect to the lateral bar 213. Similarly, the bottom portion 312b of the second panel 312 may be oriented at a downward angle with respect to the top portion 312a, and toward the central point with respect to the lateral bar 213. Concordantly, at least an edge of the bottom portion 311b of the first panel 311 and at least an edge of the bottom portion 312b of the second panel 312 may be connected using the plurality of fasteners 114 at the central point via the ground-pulverizing panel 115.

Referring to FIGS. 1A, 4B, and 6, alternatively, the tile 10 may be inserted into the tile-receiving aperture 311c, such that the tile 10 moves through the top end of the boot 120 and extends out through a bottom end of the boot 120. The tile 10 may protrude from the boot 120, such that at least a portion of the tile 10 is placed below the ground surface.

The removability and/or disassembly of the first panel 311 and/or the second panel 312 may enhance portability of any combination of the first panel 311 and/or the second panel 312 because instead of shipping a large plow structure, the components may be shipped separately. As such, the manufacturer and/or the owner can save on shipping costs.

Therefore, the present general inventive concept may include the tile installation plow 200 to install the tile 10 below the ground surface. The tile installation plow 200 may include the main body 210 to be inserted at least partially within the ground surface and the at least one panel to removably connect to a portion of the main body 210, such that the main body 210 may be changed in at least one of a size and a shape.

Figure 7A:
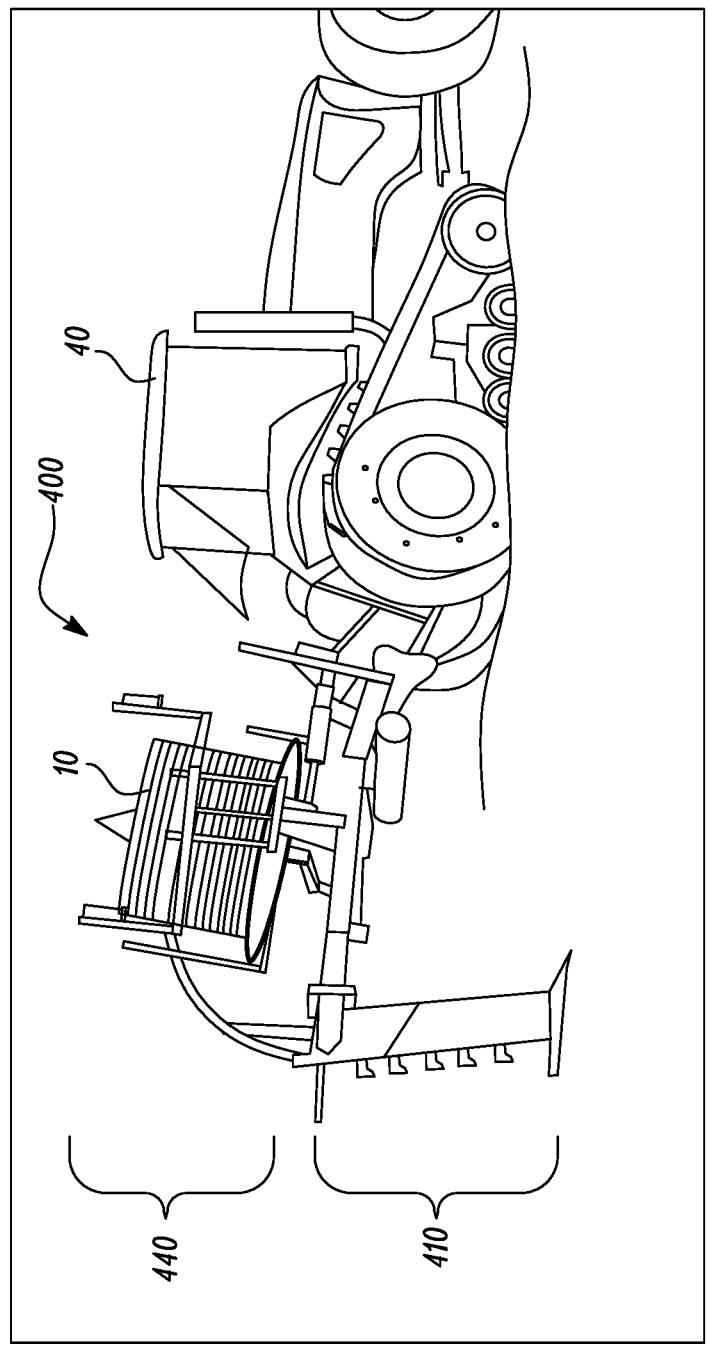
FIG. 7A illustrates a side perspective view of a low disturbance tile installation plow, according to another exemplary embodiment of the present general inventive concept.

FIG. 7A illustrates a side perspective view of a low disturbance tile installation plow 400, according to another exemplary embodiment of the present general inventive concept.

Figure 7B:
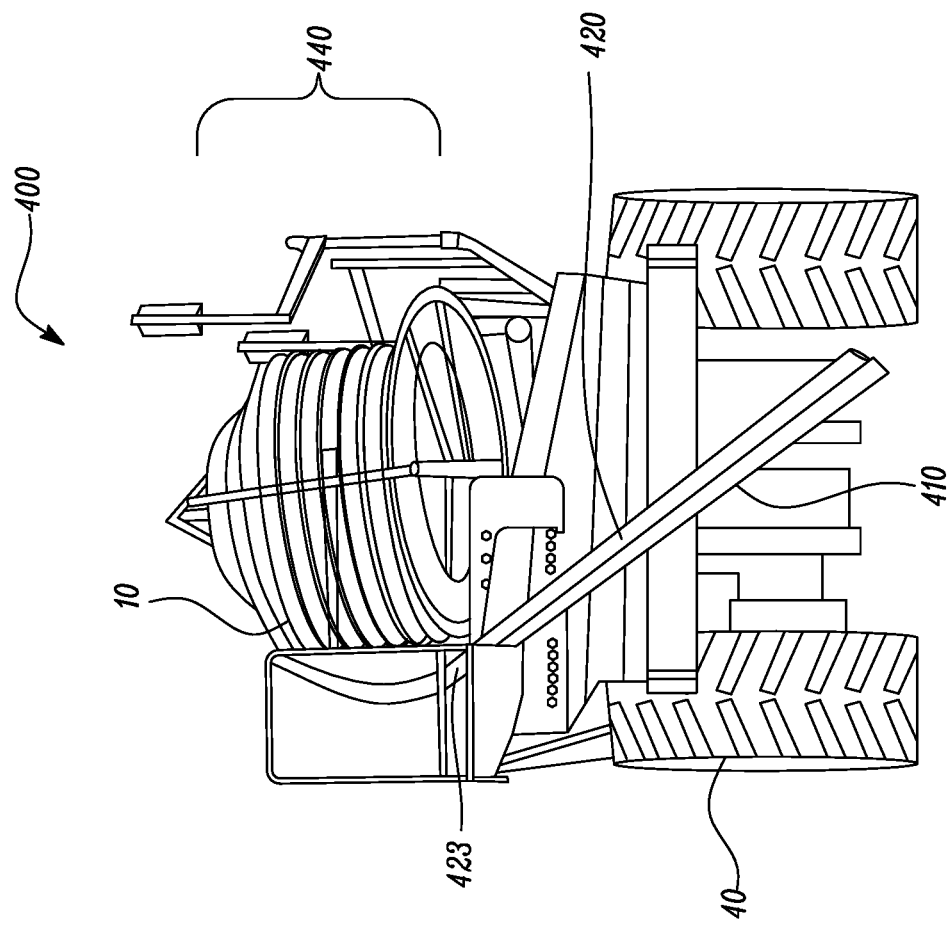
FIG. 7B illustrates a rear perspective view of the low disturbance tile installation plow, according to another exemplary embodiment of the present general inventive concept.

FIG. 7B illustrates a rear perspective view of the low disturbance tile installation plow 400, according to another exemplary embodiment of the present general inventive concept.

In a fifth embodiment, the low disturbance tile installation plow 400 (i.e. half V tile plow), and all components thereof, may be constructed from at least one of metal, plastic, wood, glass, and rubber, etc., but is not limited thereto. For example, the material may include A514 steel to ensure the thinnest possible low disturbance tile installation plow 400.

The low disturbance tile installation plow 400 may include a main body 410, a boot 420, and a tile cart 440, but is not limited thereto.

The boot 420 may include a tile-receiving aperture 423, but is not limited thereto.

Referring to FIGS. 1A, 7A, and 7B, the tile cart 440 may be disposed on at least a portion of a vehicle 40 at any feasible location. The main body 410 may be at least partially inserted into the ground using the vehicle 40. Additionally, the main body 410 may be oriented at a predetermined angle with respect to the ground surface. In other words, the main body 410 may not be perpendicular and/or parallel to the ground surface. The boot 420 may be disposed on at least a portion of a length of the main body 410. Moreover, the tile 10 on the tile cart 440 may be inserted into a top end of the tile-receiving aperture 423, such that the tile 10 may be extracted from a bottom end of the tile-receiving aperture 423 and placed below the ground surface.

Furthermore, although the main body 410 is a single portion inserted into the ground unlike the main body 110, the main body 410 may still move and/or disperse dirt and/or soil, such that there is minimal disturbance of the ground.

Therefore, the present general inventive concept may include the tile installation plow 400 to install the tile 10 below a ground surface. The tile installation plow 400 may include the main body 410 oriented at a predetermined angle with respect to the ground surface to be inserted at least partially within the ground surface and the boot 420 may be disposed on a portion of a length of the main body 410 to direct the tile 10 below the ground surface.

Also, the present general inventive concept may include the tile installation plow 400 removably connected to the vehicle 40 to install the tile 10 below the ground surface. The main body 410 to be inserted at least partially within the ground surface and the tile cart 440 connected to the vehicle 40 to hold the tile 10.

Figure 8:
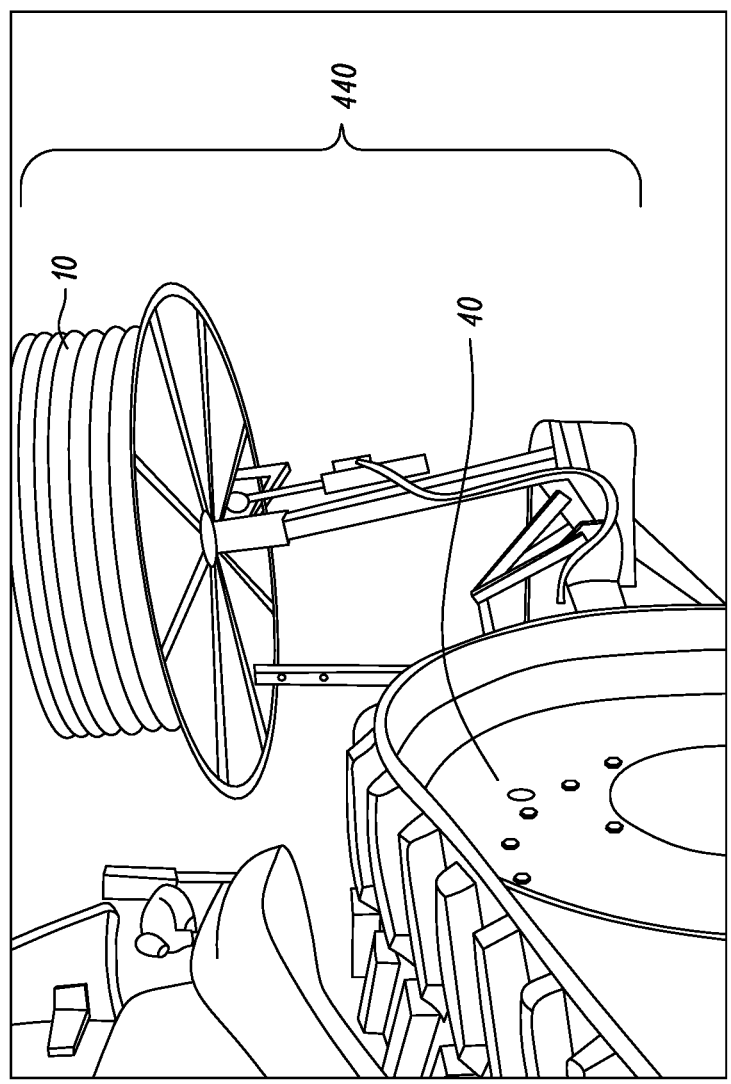
FIG. 8 illustrates a zoomed in view of a tile cart disposed on a vehicle, according to another exemplary embodiment of the present general inventive concept.

FIG. 8 illustrates a zoomed in view of a tile cart 440 disposed on a vehicle 40, according to another exemplary embodiment of the present general inventive concept.

The tile cart 440 on the vehicle 40 may move to allow a new roll of the tile 10 to be attached on the tile cart 440.

Figure 9A:
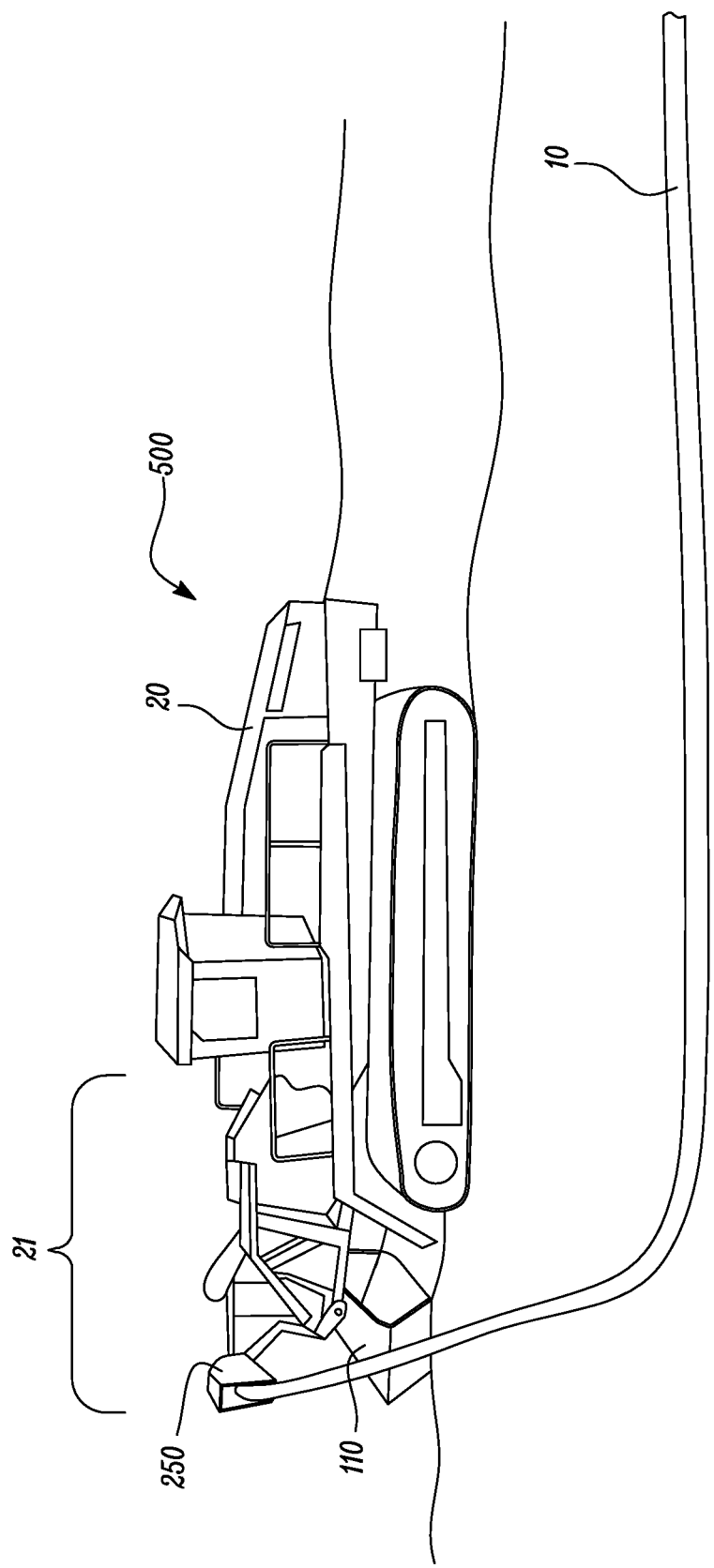
FIG. 9A illustrates a side perspective view of a low disturbance tile installation plow, according to another exemplary embodiment of the present general inventive concept.

FIG. 9A illustrates a side perspective view of a low disturbance tile installation plow 500, according to another exemplary embodiment of the present general inventive concept.

Figure 9B:
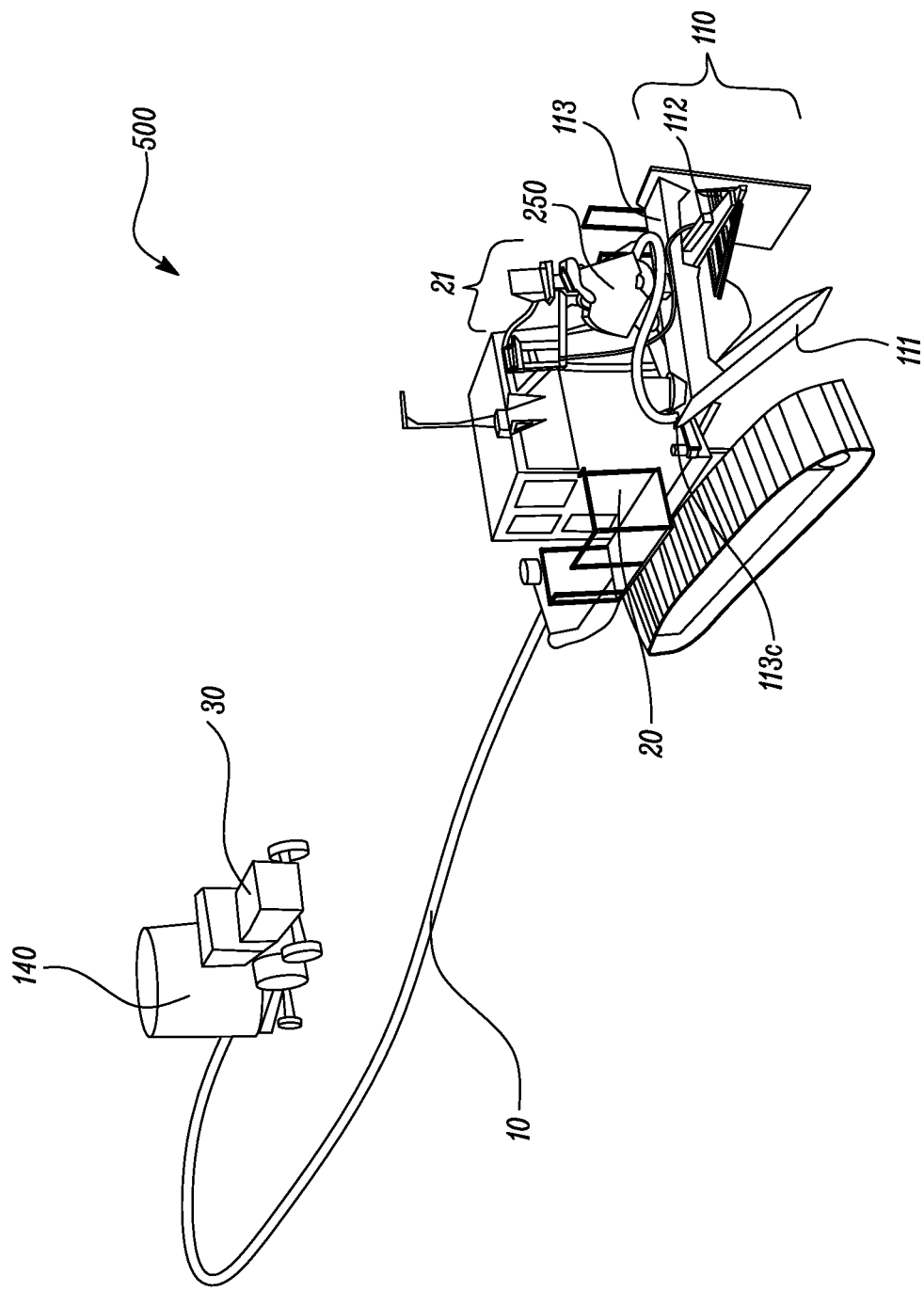
FIG. 9B illustrates an isometric front perspective view of the low disturbance tile installation plow, according to another exemplary embodiment of the present general inventive concept.

FIG. 9B illustrates an isometric front perspective view of the low disturbance tile installation plow 500, according to another exemplary embodiment of the present general inventive concept.

Figure 9C:
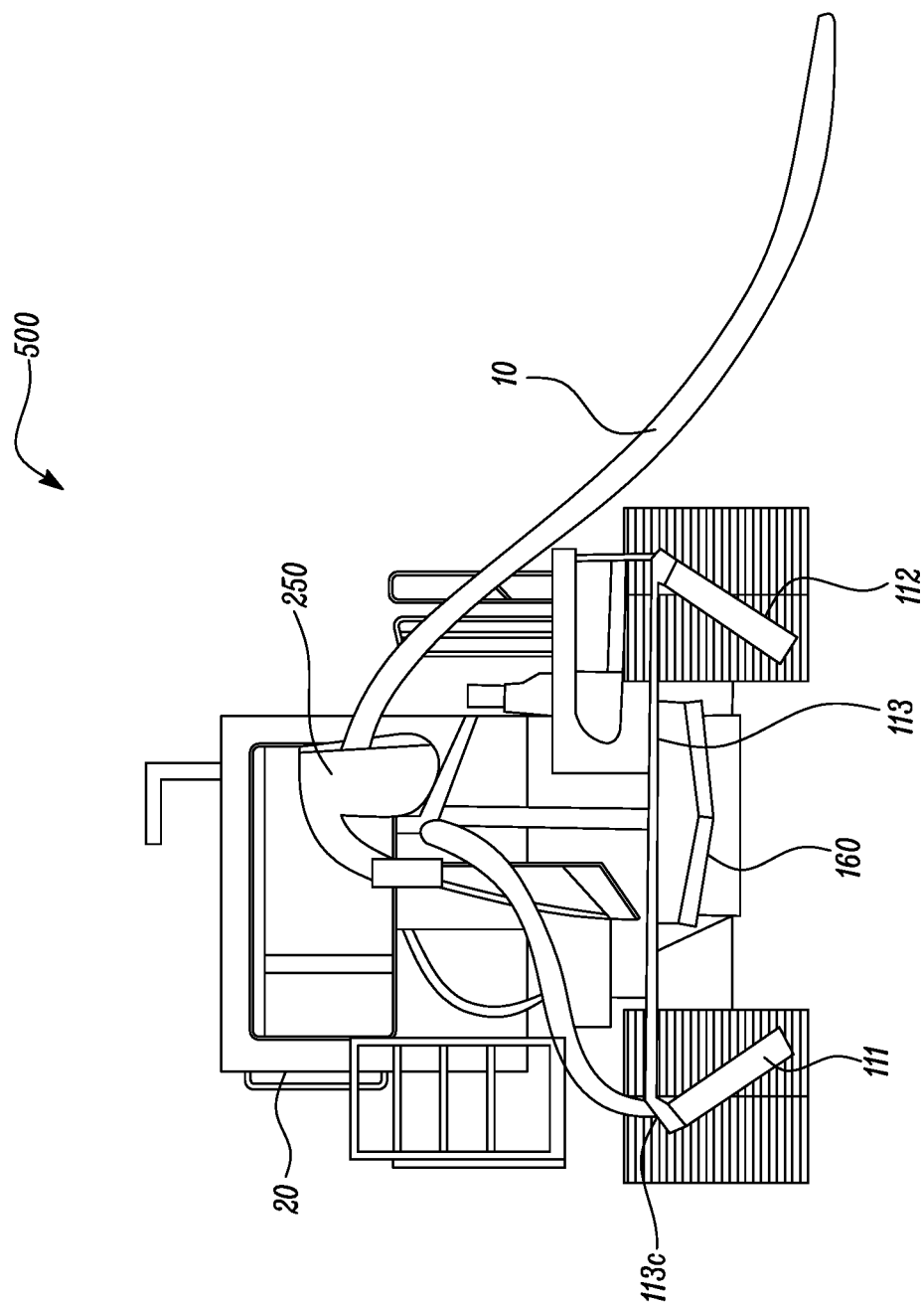
FIG. 9C illustrates a front perspective view of the low disturbance tile installation plow, according to another exemplary embodiment of the present general inventive concept.

FIG. 9C illustrates a front perspective view of the low disturbance tile installation plow 500, according to another exemplary embodiment of the present general inventive concept.

Referring to FIGS. 1A and 9A through 9C, in a sixth embodiment, the low disturbance tile installation plow 500 may include a main body 110, a boot 120, a stem 130, a tile cart 140, a hydraulic tile feeder 250, and a dirt remover 160, but is not limited thereto.

The hydraulic tile feeder 250 may include a hydraulic motor disposed therein to push and/or pull a tile 10 within the hydraulic tile feeder 250. Moreover, the hydraulic tile feeder 250 may be removably connected to at least a portion of the mechanical arm 21 on the vehicle 20. Furthermore, the tile 10 may be retrieved from the ground and does not need to be retrieved directly from the tile cart 140.

Referring to FIGS. 1A through 1D and 9A through 9C, the main body 110 may be inserted into the ground using the mechanical arm 21 on the vehicle 20. The boot 120 may be disposed on at least a portion of the first panel 111 of the main body 110. The tile cart 140 may be moved on the vehicle 30 near the vehicle 20. Moreover, the tile 10 may be retrieved from the tile cart 140 to be inserted into a top end of the hydraulic tile feeder 250, and subsequently inserted into the tile-receiving aperture 113a, such that the tile 10 may be extracted from a bottom end of the boot 120 and placed below the ground surface.

Therefore, the present general inventive concept may include the tile installation plow 500 removably connected to the mechanical arm 21 of the vehicle 20 to install the tile 10 below the ground surface. The tile installation plow 500 may include the main body 110 to be inserted at least partially within the ground surface and the hydraulic tile feeder 250 removably connected to a portion of the mechanical arm 21 to direct the tile 10 through a portion of the main body 110.

Figure 10:
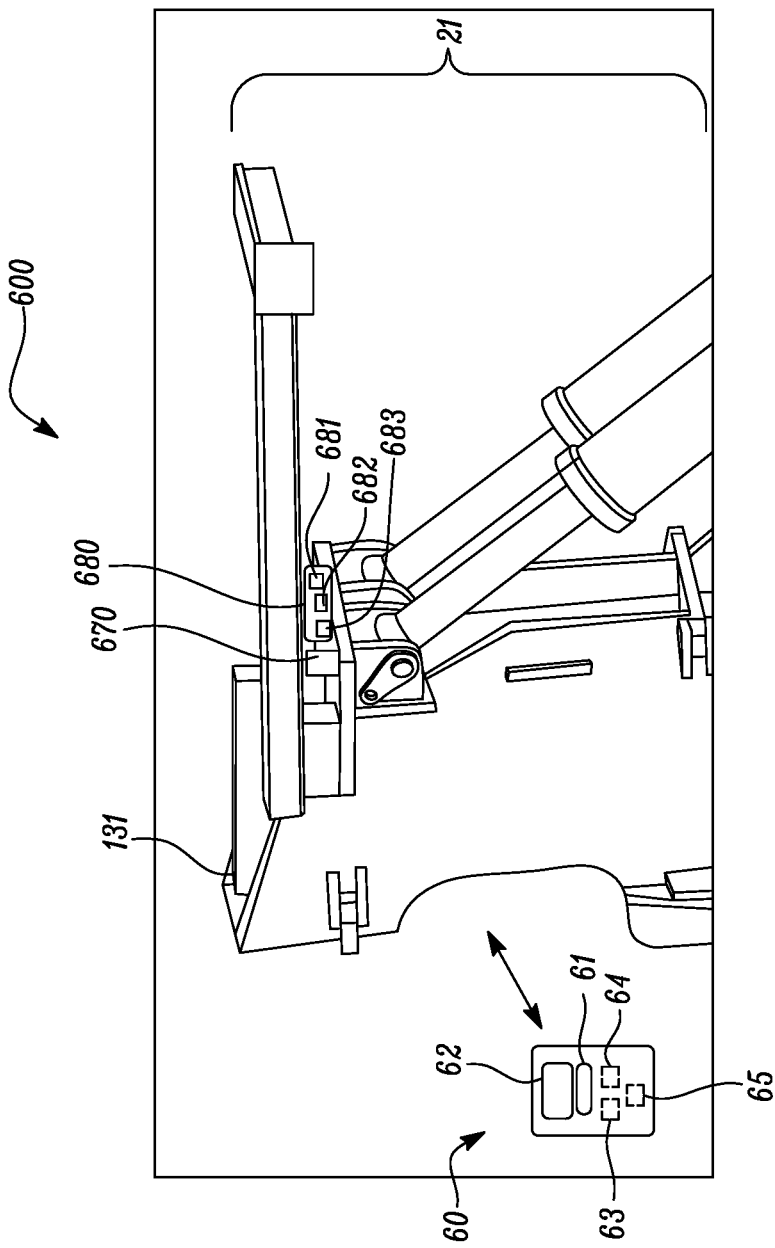
FIG. 10 illustrates a zoomed in view of a global positioning system and a control unit as disposed on a top surface of the mechanical arm, according to another exemplary embodiment of the present general inventive concept.

FIG. 10 illustrates a zoomed in view of a global positioning system 670 and a control unit 680 as disposed on a top surface of the mechanical arm 21, according to another exemplary embodiment of the present general inventive concept.

In a seventh embodiment, a system of a tile installation plow 600 may control operations of a plow. Specifically, the control unit 680 may include a processor 681, a communication unit 682, and a storage unit 683.

Furthermore, the tile installation plow 600 may include any combination of components used in the tile installation plow 100, the tile installation plow 200, the tile installation plow 400, and the tile installation plow 500, but is not limited thereto.

The processor 681 (or central processing unit, CPU) may include electronic circuitry to carry out instructions of a computer program by performing basic arithmetic, logical, control and input/output (I/O) operations specified by the instructions. The processor 230 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processor 681 may also include a microprocessor and a microcontroller.

The communication unit 682 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 683 may include a random access memory (RAM), a read-only memory (ROM), a hard disk, a flash drive, a database connected to the Internet, cloud-based storage, Internet-based storage, or any other type of storage unit.

The global positioning system (GPS) 670 may detect a location of a vehicle to which the mechanical arm 21 is mounted. Additionally, the GPS 670 may detect any topographical changes in a layout of the ground surface and/or subsurface obstructions that affect installation of the tile 10, such that the topographical changes may be transmitted to the processor 681 of the control unit 680. The processor 681 may transmit a signal to a motor located in the mechanical arm 21 to adjust a pitch of the tile 10 being placed below the ground surface, such that the tile 10 may be placed to maximize drainage efficiency of any water running into the tile 10. The processor 681 may store the pitch of the tile 10 in the storage unit 683.

Also, the processor 681 may monitor a movement speed of a vehicle. Specifically, the processor 681 may be connected to a speedometer of the vehicle and/or may be synchronized to an amount of tile remaining on a tile cart.

The GPS 670 and/or the communication unit 682 of the control unit 680 may communicate with an external device 60.

The external device 60 may be a mobile phone, a laptop computer, a tablet computer, a desktop computer, a palm pilot, a smart watch, etc., but is not limited thereto, and may be any type of mobile device that connects to the Internet or any other type of network. In other words, the device 60 may also be referenced as an apparatus 60, for at least the reason that the mobile device 60 may be movable or stationary, depending on the user's preference.

The external device 60 may include an input unit 61, display unit 62, a processor 63, a communication unit 64, and a storage unit 65.

The input unit 61 may include a keyboard, a touchpad, a mouse, a trackball, a stylus, a voice recognition unit, a visual data reader, a camera, a wireless device reader, and a holographic input unit.

The display unit 62 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 62 may be combined with the input unit 61 to be a touch-screen.

The processor 63 (or central processing unit, CPU) may include electronic circuitry to carry out instructions of a computer program by performing basic arithmetic, logical, control and input/output (I/O) operations specified by the instructions. The processor 63 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processor 63 may also include a microprocessor and a microcontroller.

The communication unit 64 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 65 may include a random access memory (RAM), a read-only memory (ROM), a hard disk, a flash drive, a database connected to the Internet, cloud-based storage, Internet-based storage, or any other type of storage unit.

The processor 681 may extract any data of the pitch of the tile 10 from the storage unit 683 to transmit the data using the communication unit 682. The communication unit 682 may communicate with the communication unit 64 of the external device 60 and store any data received onto the storage unit 65 of the external device 60.

The communication unit 682 may transmit a signal to the communication unit 64 in response to a command from the processor 681 that a tile cart is nearly empty of tile and/or the speedometer of the vehicle exceeds a predetermined threshold. The communication unit 64 sends the signal to the processor 63 of the storage unit, which may cause an alert on the external device, such as a screen flash on the display unit 62, a vibration of the external device, an auditory alarm, and/or an illumination of the input unit 61, but is not limited thereto.

As has been described in the embodiments above, any of the components above may be used independently and/or combined based on the needs of the user.

Referring to FIGS. 1A and 10, therefore, the present general inventive concept may include the tile installation plow 600 removably connected to the mechanical arm 21 of the vehicle 20 to install the tile 10 below the ground surface. The tile installation plow 600 may include the main body 110 to be inserted at least partially within the around surface and the control unit 680 to control at least one of the mechanical arm 21 and the main body 110 in response to a command entered on the control unit 680.

Figure 11B:
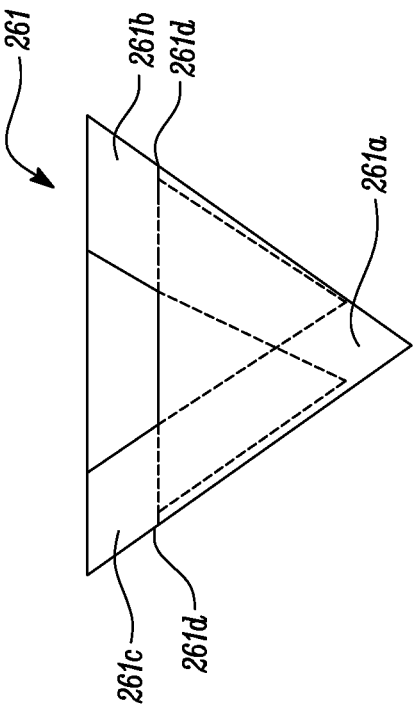
FIG. 11B illustrates a zoomed in view of the dirt-removing wedge in progress of expanding, according to another exemplary embodiment of the present general inventive concept.
Figure 11C:
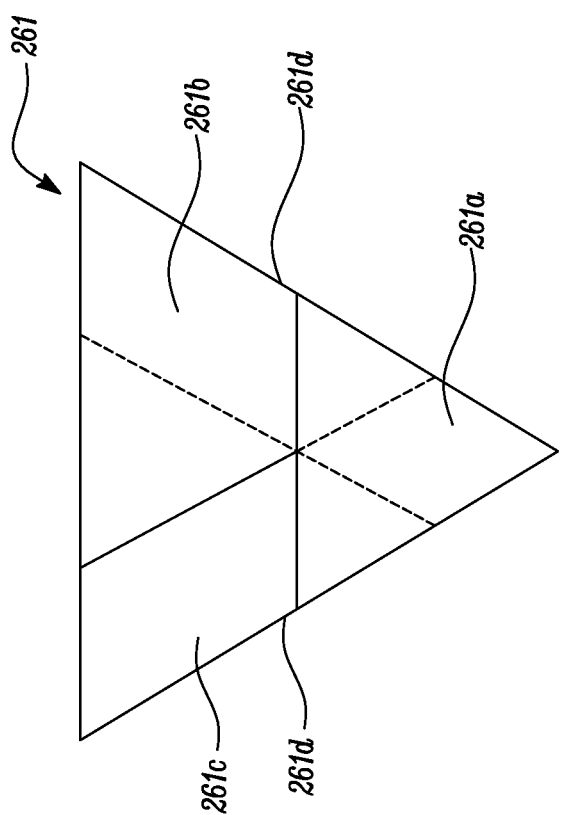
FIG. 11C illustrates a zoomed in view of the dirt-removing wedge in an expanded position, according to another exemplary embodiment of the present general inventive concept.
Figure 11A:
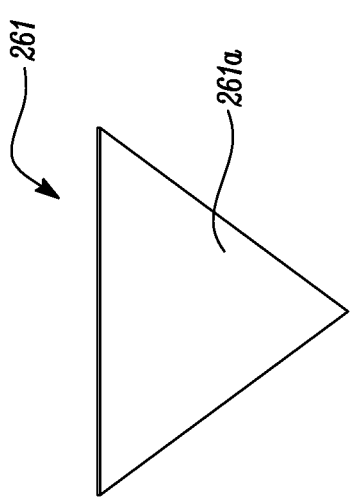
FIG. 11A illustrates a zoomed in view of a dirt-removing wedge in a retracted position, according to another exemplary embodiment of the present general inventive concept.

FIG. 11A illustrates a zoomed in view of a dirt-removing wedge 261 in a retracted position, according to another exemplary embodiment of the present general inventive concept.

FIG. 11B illustrates a zoomed in view of the dirt-removing wedge 261 in progress of expanding, according to another exemplary embodiment of the present general inventive concept.

FIG. 11C illustrates a zoomed in view of the dirt-removing wedge 261 in an expanded position, according to another exemplary embodiment of the present general inventive concept.

The dirt-removing wedge 261 may include a first wedge panel 261*a*, a second wedge panel 261*b*, a third wedge panel 261*c*, and a plurality of sliding rails 261*d*, but is not limited thereto.

Referring to FIGS. 11A through 11C, the dirt-removing wedge 261 is illustrated to have a V-prism shape or a triangular prism shape. However, the dirt-removing wedge 261 may be a square prism, a rectangular prism, a circular prism, a pentagonal prism, a hexagonal prism, an octagonal prism, or any other shape known to one of ordinary skill in the art, but is not limited thereto.

In an eighth embodiment, the dirt-removing wedge 261 may be disposed on at least one of the main body 110 and the main body 210, but is not limited thereto. The dirt-removing wedge 261 may expand in size to cover a wider area, such that more dirt and/or soil may be removed. Specifically, the dirt-removing wedge 261 may expand in response to a command from the user operating the dirt-removing wedge 261.

Referring to FIGS. 11A through 11C, the plurality of sliding rails 261*d* may be disposed along at least a portion of at least one edge of the first wedge panel 261*a*. The plurality of sliding rails 261*d* may be disposed along at least a portion of at least one edge of the second wedge panel 261*b*. The plurality of sliding rails 261*d* may be disposed along at least a portion of at least one edge of the third wedge panel 261*c*. As such, the first wedge panel 261*a*, the second wedge panel 261*b*, and/or the third wedge panel 261*c* may move (i.e. slide) in an outward direction with respect to each other using the plurality of sliding rails 261*d*.

Figure 12A:
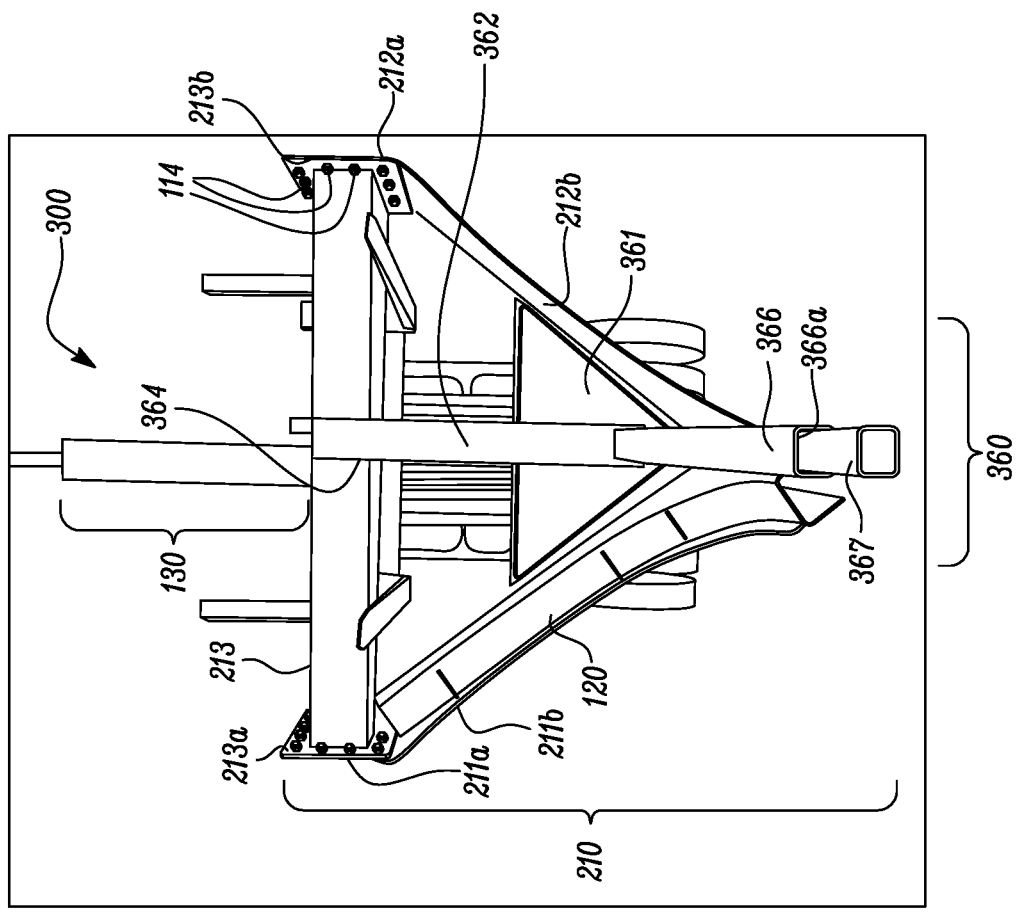
FIG. 12A illustrates a front view of a dirt remover as disposed on the main body, according to another exemplary embodiment of the present general inventive concept.

FIG. 12A illustrates a front perspective view of a dirt remover 360 as disposed on the main body 210, according to another exemplary embodiment of the present general inventive concept.

Figure 12B:
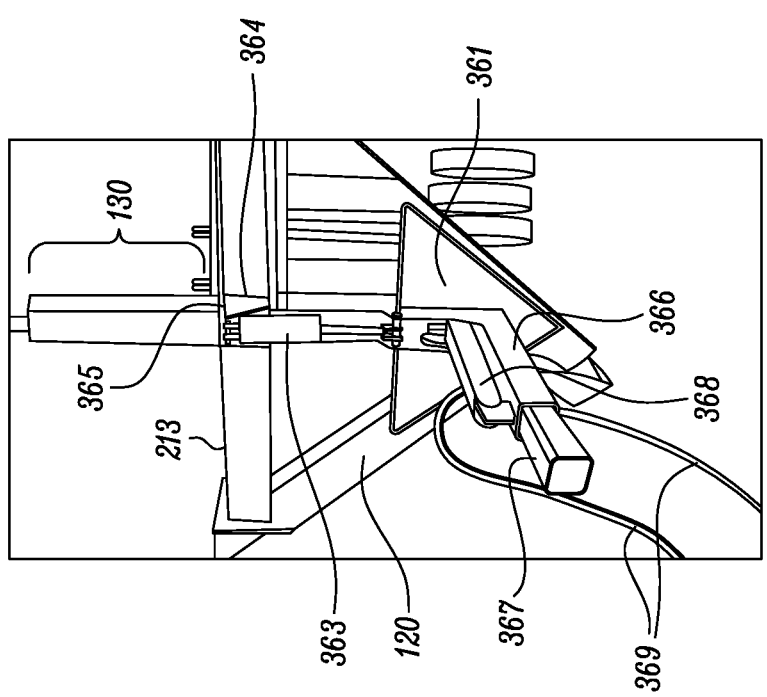
FIG. 12B illustrates a front perspective view of the dirt remover as disposed on the main body, according to another exemplary embodiment of the present general inventive concept.

FIG. 12B illustrates a front perspective view of the dirt remover 360 as disposed on the main body 210, according to another exemplary embodiment of the present general inventive concept.

Figure 12C:
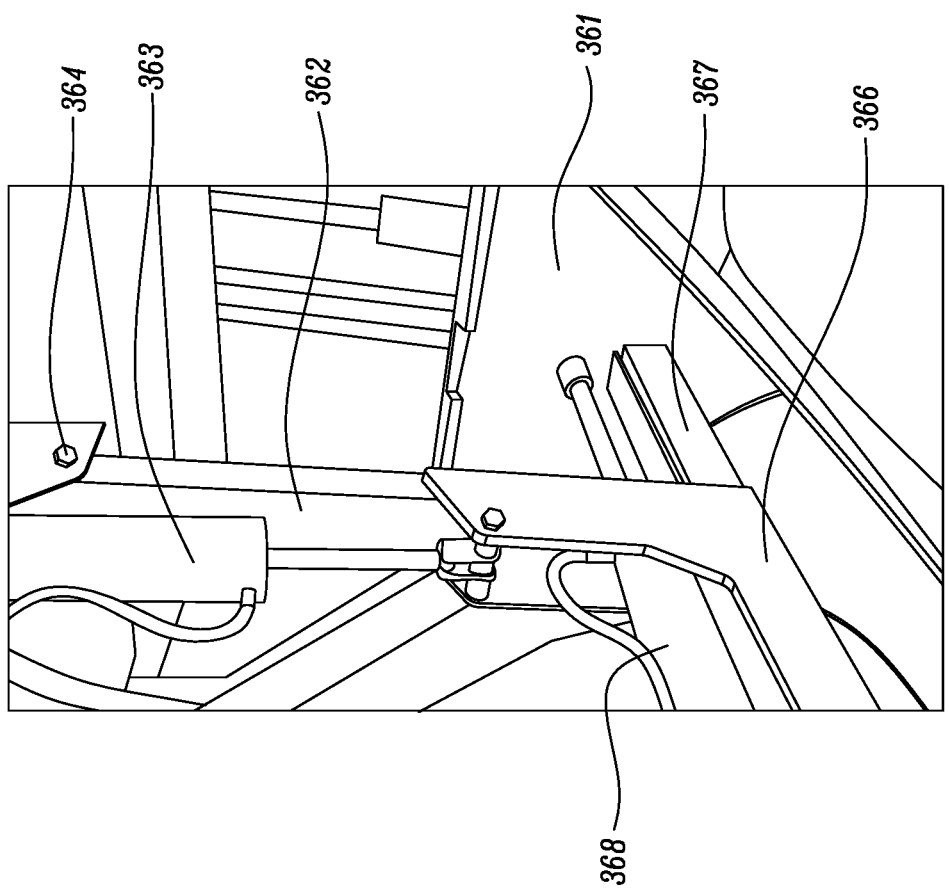
FIG. 12C illustrates a zoomed in view of a dirt-removing wedge of the dirt remover in an extended position, according to another exemplary embodiment of the present general inventive concept.

FIG. 12C illustrates a zoomed in view of a dirt-removing wedge 361 of the dirt remover 360 in an extended position, according to another exemplary embodiment of the present general inventive concept.

A tile installation plow 300 may include the main body 210, the boot 120, the stem 130, and the dirt remover 360 but is not limited thereto.

Referring to FIGS. 12A through 12C, the dirt remover 360 may include the dirt-removing wedge 361, a wedge-holding arm 362, a first hydraulic piston 363, a first hinge 364, a second hinge 365, a sliding bar holder 366, a hydraulic sliding bar 367, a second hydraulic piston 368, and a plurality of hydraulic cables 369, but is not limited thereto.

The sliding bar holder 366 may include a bar-receiving aperture 366*a*, but is not limited thereto.

In a ninth embodiment, the dirt remover 360 may be disposed on at least a portion of an outer surface of the lateral bar 213. Specifically, the wedge-holding arm 362 may be disposed at an end thereof via the first hinge 364. The dirt-removing wedge 361 and the wedge-holding arm 362 may pivot on the first hinge 364 in response to the user activating the first hydraulic piston 363 that pivots on the second hinge 365, such that the dirt-removing wedge 360 moves from a first position (i.e. up) in a first direction or second direction to a second position (i.e. down) and pushes and/or pulls any dirt that has accumulated within the main body 210. Specifically, the first hydraulic piston 363 may activate in response to hydraulic fluid flowing within the plurality of hydraulic cables 369.

Referring to FIG. 12C, additionally, the sliding bar holder 366 may be disposed on an opposite end of the wedge-holding arm 362 with respect to the end connected to the first hinge 364. The hydraulic sliding bar 367 may be removably disposed within the bar-receiving aperture 366*a* of the sliding bar holder 366. Additionally, an end of the hydraulic sliding bar 367 may be disposed on at least a portion of the dirt-removing wedge 361. Moreover, the sliding bar holder 366 may support the hydraulic sliding bar 367 by preventing it from falling to the ground. The second hydraulic piston 368 may be disposed on a portion of a rear surface of the dirt-removing wedge 361. The hydraulic sliding bar 367 may push and/or pull the dirt-removing wedge 361 at least partially in a first lateral direction or a second lateral direction from a first lateral position (i.e. outside the main body) to a second lateral position (i.e, inside the main body), such that the dirt-removing wedge 361 may extend further within the main body 210. Specifically, the second hydraulic piston 368 may activate in response to hydraulic fluid flowing within the plurality of hydraulic cables 369 to push and/or pull the hydraulic sliding bar 367. As such, the dirt-removing wedge 360 may remove more dirt and/or soil that collects on at least a portion of an inner surface of the bottom portion 211*b*, at least a portion of an outer surface of the boot 120, and/or at least a portion of an inner surface of the bottom portion 212*b*.

Therefore, the present general inventive concept may include the tile installation plow 300 to install the tile 10 below the around surface. The tile installation plow 300 may include the main body 210 to be inserted at least partially within the ground surface and the dirt remover 360 pivotally disposed on a portion of the main body 210. The remover 360 may include the dirt-removing wedge 361 to remove dirt accumulated within the main body 210, and the second hydraulic piston 360 may be disposed on a portion of the dirt-removing wedge 361 to move the dirt-removing wedge 361 in a lateral direction, such that the dirt-removing wedge 361 remains outside the main body 210 in the first position and moves inside the main body 210 in the second position.

Figure 13A:
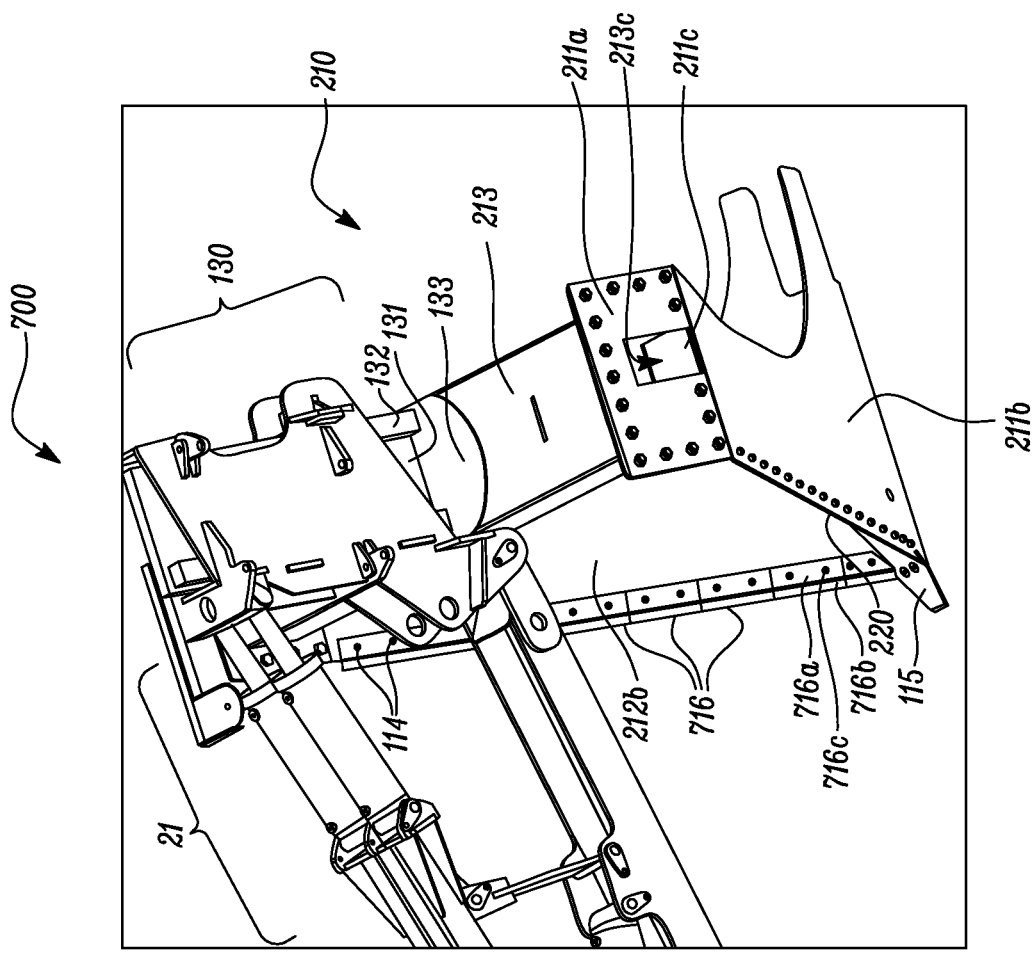
FIG. 13A illustrates an isometric top rear perspective view of the main body disposed on the mechanical arm, according to another exemplary embodiment of the present general inventive concept.

FIG. 13A illustrates an isometric top rear perspective view of the main body 210 disposed on the mechanical arm 21, according to another exemplary embodiment of the present general inventive concept.

Figure 13B:
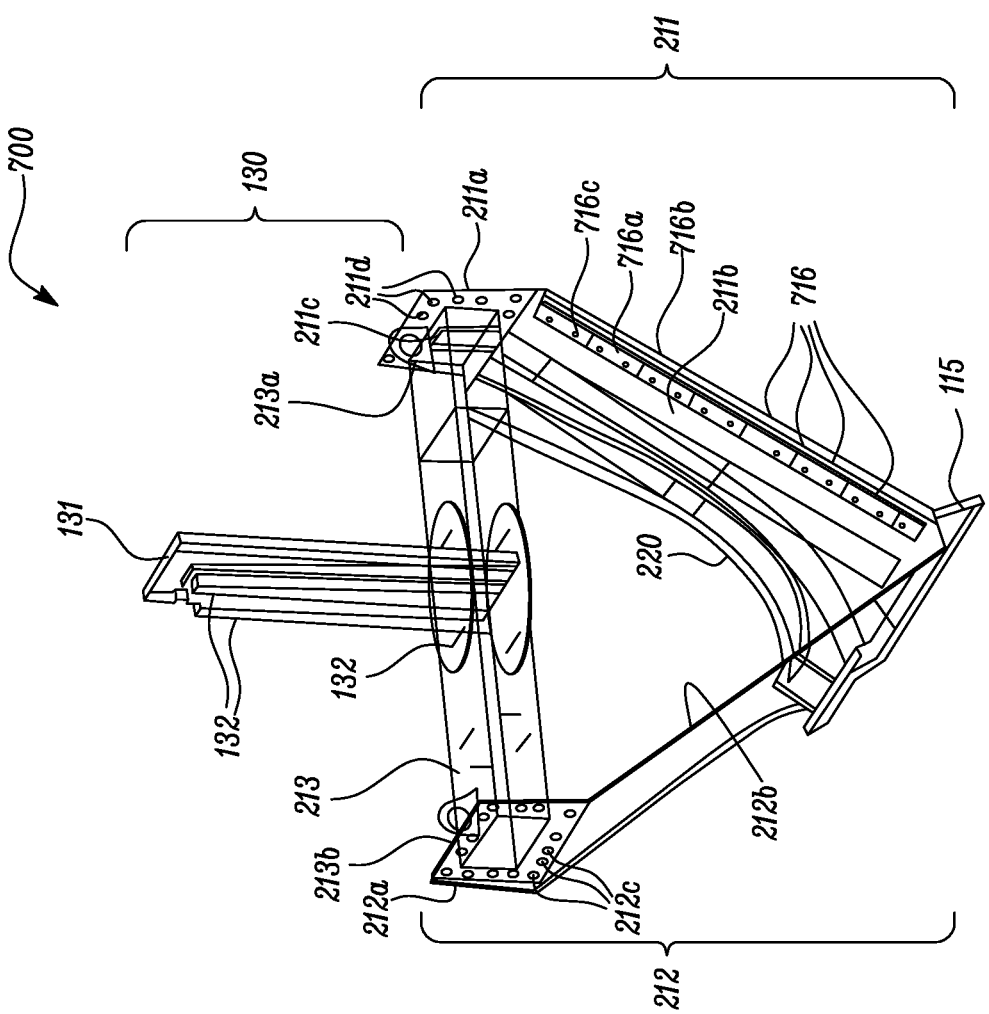
FIG. 13B illustrates an isometric front perspective view of the boot disposed on the inner surface of the first panel of the main body, according to another exemplary embodiment of the present general inventive concept.

FIG. 13B illustrates an isometric front perspective view of the boot disposed on the inner surface of the first panel of the main body, according to another exemplary embodiment of the present general inventive concept.

Each of the plurality of guard blades 716 may include a blade portion 716a, an attachment portion 716b, and at least one fastener-receiving aperture 716c, but is not limited thereto.

Furthermore, the tile installation plow 700 may include any combination of components used in the tile installation plow 100, the tile installation plow 200, the tile installation plow 400, the tile installation plow 500, the tile installation plow 600, and the tile installation plow 700, but is not limited thereto.

Referring to FIGS. 13A and 13B, the plurality of guard blades 716 are illustrated as disposed on at least a portion of an edge of the bottom portion 212b. However, the plurality of guard blades 716 may also be disposed on at least a portion of an edge of the bottom portion 211b. In other words, the plurality of guard blades 716 may be disposed on a portion of at least one panel.

In a tenth embodiment, the plurality of guard blades 716 may prevent damage and/or wear to the bottom portion 211b and/or the bottom portion 212b. Specifically, each of the plurality of guard blades 716 may be replaced when the blade portion 716a and/or the attachment portion 716b is unable to protect the bottom portion 211b and/or the bottom portion 212b.

The ground surface may move and/or break apart in response to the main body 210 being inserted below the ground surface. Specifically, the blade portion 716a may move and/or break apart any dirt and/or soil. Additionally, the blade portion 716a may prevent damage from hard obstructions, such as rock, concrete, and/or cement, but is not limited thereto.

Each of the plurality of guard blades 716 may be affixed and/or adhered to the bottom portion 211b and/or the bottom portion 212b by inserting at least one of the plurality of fasteners 114 into the at least one fastener-receiving aperture 716c. Alternatively, each of the plurality of guard blades 716 may be removed by extracting the plurality of fasteners 114 from the at least one fastener-receiving aperture 716c.

Therefore, the present general inventive concept may include the tile installation plow 700 to install the tile 10 below the ground surface. The tile installation plow 200 may include the main body 210 to be inserted at least partially within the ground surface. The main body may include the lateral bar 213, at least one panel may be disposed on an end of the lateral bar 213, and the plurality of guard blades 716 removably disposed on at least a portion of an edge of the at least one panel to prevent damage to the at least one panel in response to a movement within the ground surface. The tile installation plow 700 may further include the boot 220 disposed on a portion of the at least one panel to direct the tile 10 along the at least one panel to below the ground surface.

Figure 14:
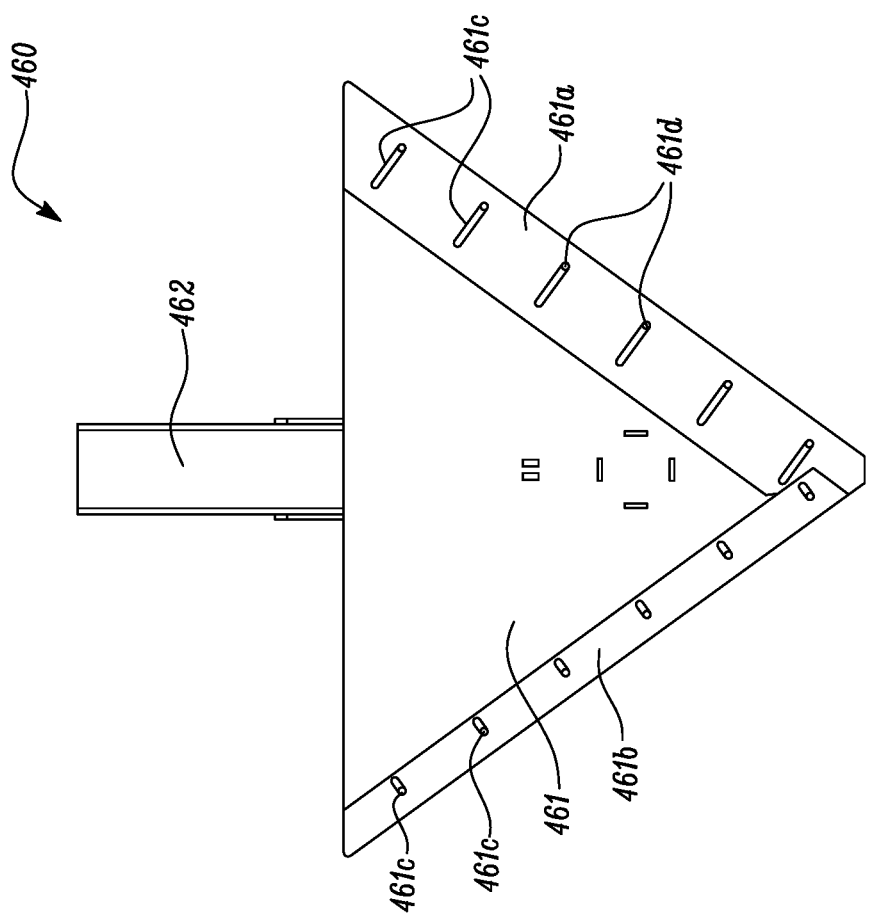
FIG. 14 illustrates a front perspective view of the dirt remover, according to another exemplary embodiment of the present general inventive concept.

FIG. 14 illustrates a front perspective view of the dirt remover 460, according to another exemplary embodiment of the present general inventive concept.

In an eleventh embodiment, the dirt remover 460 may include a dirt-removing wedge 461 and a wedge-holding arm 462, but is not limited thereto.

The dirt-removing wedge 461 may include a first wedge flap 461a, a second wedge flap 461b, a plurality of slits 461c, and a plurality of pins 461d, but is not limited thereto.

The first wedge flap 461a may be disposed along at least a portion of a first edge of the dirt-removing wedge 461. The second wedge flap 461b may be disposed along at least a portion of a second edge of the dirt-removing wedge 461.

The dirt remover 460 may operate similar to the dirt remover 160 and/or the dirt remover 360, but is not limited thereto. The plurality of pins 461d may protrude from at least a portion of an outer surface of the dirt-removing wedge 461. The first wedge flap 461a may move (i.e. slide) in a first direction or a second direction from a first position (i.e. retracted) to at least partially in a second position (i.e. extended) along the plurality of slits 461c, such that the first wedge flap 461a may resist movement when the plurality of pins 461d reach a first end of each of the plurality of slits 461c of the first wedge flap 461a. Also, the second wedge flap 461b may move in the first direction or the second direction from the first position to at least partially in the second position along the plurality of slits 461c, such that the second wedge flap 461b may resist movement when the plurality of pins 461d reach the first end of the plurality of slits 461c of the second wedge flap 461b.

As such, the first wedge flap 461a and the second wedge flap 461b may at least partially expand to increase a surface area (i.e. a size) of the dirt-removing wedge 461 and remove more dirt and/or soil thereby. Conversely, the first wedge flap 461a and the second wedge flap 461b may move in the second direction or the first direction from the second position to the first position along the plurality of slits 461c, such that the first wedge flap 461a and the second wedge flap 461b may resist movement when the plurality of pins 461d reach a second end of each of the plurality of slits 461c.

Moreover, the first wedge flap 461a may cover at least a portion of a first edge of the dirt-removing wedge 461. Similarly, the second wedge flap 461b may cover at least a portion of a second edge of the dirt-removing wedge 461. The first wedge flap 461a and the second wedge flap 461b may prevent damage to the dirt-removing wedge 461 during use. Moreover, the first wedge flap 461a and the second wedge flap 461b may be removed and replaced with another first wedge flap 461a and another second wedge flap 461b, respectively when the first wedge flap 461a and the second wedge flap 461b do not protect the dirt-removing wedge 461.

Therefore, the present general inventive concept may include the tile installation plow 200 to install the tile 10 below the ground surface. The tile installation plow 200 may include the main body 210 to be inserted at least partially within the ground surface and the dirt remover 460 may be pivotally disposed on a portion of the main body 210. The dirt remover 460 may include the dirt-removing wedge 461 to remove dirt accumulated within the main body 210, the first wedge flap 461a may be disposed along a portion of the first edge of the dirt-removing wedge 461 to increase the surface area of the dirt-removing wedge 461 by moving from retracted in a first position to extended in a second position, and the second wedge flap 461b may be disposed along a portion of the second edge of the dirt-removing wedge 461 to increase the surface area of the dirt-removing wedge 461 by moving from retracted in the first position to extended in the second position.

The present general inventive concept may include a tile installation plow 200 connected to a mechanical arm 21 of a vehicle 20 to install a tile 10 below a ground surface, the tile installation plow 200 including a main body 210 to be inserted at least partially within the ground surface, a boot 220 removably disposed on at least a portion of an inner surface of the main body 210 to direct the tile 10 along a portion of the main body 210 under the ground surface, and a tile cart 140 connected to the vehicle 20 to hold the tile 10 thereon.

The main body 210 may include a lateral bar 213, a first panel 211 removably disposed on a first end of the lateral bar 213 to till dirt in response to movement of the vehicle 20 on the ground surface, such that the first panel 211 moves through the ground surface, a second panel 212 removably disposed on a second end of the lateral bar 213 to till dirt in response to movement of the vehicle 20 on the ground surface, such that the second panel 212 moves through the ground surface, and a ground-pulverizing panel 115 connected to the first panel 211 and the second panel 212 to protrude away from the first panel 211 and the second panel 212 to break apart the ground surface in response to movement of the vehicle 20.

The first panel 211 and the second panel 212 may each include a top portion removably disposed on the lateral bar 213, and a bottom portion oriented at a downward angle with respect to the top portion, and toward a central point with respect to the lateral bar 213, such that the first panel 211 and the second panel 212 are connected.

The main body 210 may further include a stem 130 perpendicularly connected to at least a portion of the lateral bar 213 with respect to a direction to provide a surface area for the mechanical arm 21 to grasp, such that the main body 210 moves in response to a movement of the mechanical arm 21.

The tile installation plow 200 may further include a hydraulic the feeder 150 disposed on at least a portion of the main body 210 to move the tile 10 from the tile cart 140 into the boot 220.

The hydraulic the feeder 150 may be wirelessly synchronized to a rotation speed of a spool on the tile cart 140, such that the hydraulic tile feeder 150 adjusts a speed of moving the tile 10 based on the rotation speed of the tile cart.

The tile installation plow 200 may further include a dirt remover 160 pivotally disposed on at least a portion of the main body 210 to move from up in a first position to at least partially down in a second position, such that dirt rs removed within the main body 210.

The present general inventive concept may also include a tile installation plow 400 connected to a vehicle 40 to install a tile 10 below a ground surface, the tile installation plow 400 including a main body 410 oriented at a predetermined angle with respect to the ground surface to be inserted at least partially within the ground surface, and a boot 420 disposed on an entire length of the main body 410, the boot 420 including a tile-receiving aperture 423 to receive the tile 10 at a top end, and to direct the tile 10 under the ground surface through a bottom end.

The tile installation plow 400 may further include a tile cart 440 disposed on the vehicle 40 to hold the tile thereon.

The tile-receiving aperture 423 may receive the tile 10 from the tile cart 440.

The present general inventive concept may also include a tile installation plow 300 connected to a vehicle 20 to install a tile 10 below a ground surface, the tile installation plow 300 including a main body 210 to be inserted at least partially within the ground surface, a boot 120 disposed on at least a portion of an inner surface of the main body 210 to direct the tile 10 along a portion of the main body 210 under the ground surface, and a dirt remover 360 pivotally disposed on at least a portion of the main body 210, the dirt remover 360 including a dirt-removing wedge 361 to remove dirt accumulated within the main body 210, a first hydraulic piston 363 disposed on at least a portion of the main body 210 to move the dirt-removing wedge 361 from up in a first position to down in a second position, and a second hydraulic piston 368 disposed on at least a portion of the dirt-removing wedge 361 to move the dirt-removing wedge in a lateral direction, such that the dirt-removing wedge 361 remains outside the main body 210 in a first lateral position and moves inside the main body 210 in a second lateral position.

The dirt remover 360 may remove dirt from at least one of the main body 210 and an outer surface of the boot 120.

The present general inventive concept may also include a tile installation plow 300 connected to a vehicle 20 to install a tile 10 below a ground surface, the tile installation plow 300 including a main body 210 to be inserted at least partially within the ground surface, a boot 120 disposed on at least a portion of an inner surface of the main body 210 to direct the tile 10 along a portion of the main body 210 under the ground surface, and a dirt remover 460 pivotally disposed on a portion of the main body 210, the dirt remover 460 including a dirt-removing wedge 461 to remove dirt accumulated within the main body 210, a first wedge flap 461a disposed on at least a portion of a first edge of the dirt-removing wedge 461 to increase a surface area of the dirt-removing wedge 461 by moving from retracted in a first position to extended in a second position, and a second wedge flap 461b disposed on at least a portion of a second edge of the dirt-removing wedge 461 to increase the surface area of the dirt-removing wedge 461 by moving from retracted in another first position to extended in another second position.

The first wedge flap 461a and the second wedge flap 461b may be removable.

The present general inventive concept may also include a tile installation plow 700 connected to a mechanical arm 21 of a vehicle 20 to install a tile 10 below a ground surface, the tile installation plow 700 including a main body 210 to be inserted at least partially within the ground surface, the main body 210 including a lateral bar 213, at least one panel disposed on an end of the lateral bar 213, and a plurality of guard blades 716 removably disposed on at least a portion of an edge of the at least one panel to prevent damage to the at least one panel in response to a movement within the ground surface, a boot 220 disposed on at least a portion of the at least one panel to direct the tile 10 along a portion of the main body 210 under the ground surface, and a tile cart 140 connected to the vehicle 20 to hold the tile 10 thereon.

The at least one panel may include a top portion removably disposed on the lateral bar 213, and a bottom portion oriented at a downward angle with respect to the top portion, and toward a central point with respect to the lateral bar 213.

Each of the plurality of guard blades 716 may include a blade portion 716a to break apart dirt, and an attachment portion 716b disposed on at least a portion of the blade portion 716a to connect to the at least one panel.

The main body 210 may further include a stem 130 perpendicularly connected to at least a portion of the lateral bar 213 with respect to a direction to provide a surface area for the mechanical arm 21 to grasp, such that the main body 210 moves in response to a movement of the mechanical arm 21.

The tile installation plow 700 may further include a hydraulic tile feeder 150 disposed on at least a portion of the main body 210 to move the tile 10 from the tile cart 140 into the boot 220.

The hydraulic tile feeder 150 may be wirelessly synchronized to a rotation speed of a spool on the tile cart 140, such that the hydraulic tile feeder 150 adjusts a speed of moving the tile 10 based on the rotation speed of the tile cart 140.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A tile installation plow connected to a vehicle to install a tile below a ground surface, the tile installation plow comprising:
   a main body to be inserted at least partially within the ground surface, the main body comprising:
   a lateral bar,
   at least one panel disposed on an end of the lateral bar, and
   a tile-receiving aperture disposed on at least a portion of the at least one panel to receive the tile therethrough;
   a boot disposed on at least a portion of the at least one panel to direct the tile along a portion of the main body under the ground surface; and
   a tile cart connected to the vehicle to hold the tile thereon.

2. The tile installation plow of claim 1, wherein the at least one panel comprises:
   a first panel disposed at a first end of the lateral bar
   a second panel disposed at a second end of the lateral bar.

3. The tile installation plow of claim 2, wherein the main body further comprises:
   a first guard blade disposed on at least a portion of an edge of the first panel to prevent damage to the first panel in response to a movement within the ground surface; and
   a second guard blade disposed on at least a portion of an edge of the second panel to prevent damage to the second panel in response to a movement within the ground surface.

4. The tile installation plow of claim 3, wherein at least one of the boot, the first guard blade, and the second guard blade is removable from the main body.

5. The tile installation plow of claim 2, wherein the main body further comprises:
   at least one guard blade removably disposed on at least a portion of an edge of the at least one panel to prevent damage to the at least one panel in response to a movement within the ground surface.

6. The tile installation plow of claim 5, wherein the at least one guard blade comprises:
   a blade portion to break apart dirt; and
   an attachment portion disposed on at least a portion of the blade portion to connect to the at least one panel.

7. The tile installation plow of claim 2, wherein the at least one panel comprises:
   a top portion removably disposed on the lateral bar; and
   a bottom portion oriented at a downward angle with respect to the top portion, and toward a central point with respect to the lateral bar.

8. The tile installation plow of claim 2, wherein the main body further comprises:
   a stem connected to at least a portion of the lateral bar and at least a portion of the vehicle, such that the main body moves in response to a movement of at least the portion of the vehicle.

9. The tile installation plow of claim 2, wherein the lateral bar, the first panel, and the second panel are connected together to form at least one of a v-shape and a triangular-like shape.

10. A tile installation plow connected to a vehicle to install a tile below a ground surface, the tile installation plow comprising:
    a main body to be inserted at least partially within the ground surface;
    a boot disposed on at least a portion of the main body to direct the tile along a portion of the main body under the ground surface;
    a dirt remover pivotally disposed on at least a portion of the main body to move from a first position to a second position, such that dirt is removed from at least a portion of an area within the main body; and
    a tile cart connected to the vehicle to hold the tile thereon.

11. The tile installation plow of claim 10, wherein at least a portion of the main body has a v-shape.

12. The tile installation plow of claim 10, wherein the boot is removable from the main body.

13. The tile installation plow of claim 10, wherein the dirt remover comprises a dirt-removing wedge to remove dirt accumulated within the main body.

14. The tile installation plow of claim 13, wherein the dirt-removing wedge is controllable to expand to a larger size and contract to a smaller size.

* * * * *